United States Patent [19]

Toyooka et al.

[11] Patent Number: 5,301,869

[45] Date of Patent: Apr. 12, 1994

[54] MACHINE FOR MANUFACTURING WELDED STEEL PIPES AND METHOD FOR HANDLING THE MACHINE

[75] Inventors: Takaaki Toyooka; Yuuji Hashimoto, both of Chiba; Susumu Itadani; Tsutomu Ide, both of Handa, all of Japan

[73] Assignee: Kawasaki Steel Corporation, Japan

[21] Appl. No.: 721,566

[22] PCT Filed: Dec. 4, 1990

[86] PCT No.: PCT/JP90/01572

§ 371 Date: Jul. 29, 1991

§ 102(e) Date: Jul. 29, 1991

[87] PCT Pub. No.: WO91/08064

PCT Pub. Date: Jun. 13, 1991

[30] Foreign Application Priority Data

Dec. 4, 1989 [JP] Japan .................. 1-314694
Dec. 4, 1989 [JP] Japan .................. 1-314696
Dec. 6, 1989 [JP] Japan .................. 1-317289
Dec. 6, 1989 [JP] Japan .................. 1-317290
Nov. 14, 1990 [JP] Japan .................. 2-306297

[51] Int. Cl.⁵ .................................. B23K 37/04
[52] U.S. Cl. ........................ 228/147; 228/17;
228/17.5; 72/52; 72/181; 72/368
[58] Field of Search ............ 228/147, 150, 17, 17.5;
72/21, 52, 181, 368; 219/59.1

[56] References Cited

U.S. PATENT DOCUMENTS 4,299,108  11/1981  Kato et al. ................ 228/17
4,865,243   9/1989  Meier ....................... 228/17

Primary Examiner—Samuel M. Heinrich
Attorney, Agent, or Firm—Austin R. Miller

[57] ABSTRACT

The present invention is a machine for manufacturing welded steel pipes, in which an edge bending roll for constraining under pressure a strip from its pipe edge portions to the boundaries between the pipe edge portions and its pipe side portions to bend the strip, a first center bending roll for constraining under pressure the pipe side portions to bend the pipe side portions, second to fourth center bending rolls for constraining under pressure the strip from the boundaries between the pipe side portions and its pipe bottom portion to the pipe bottom portion and applying lateral pressure to the pipe from both sides to bend the boundaries and the pipe bottom portion and a plurality of cage rolls arranged on both the sides of these center bending rolls, first and second fin pass rolls for further forming under pressure the pipe, are arranged in order from the stream side to the downstreamside of a roll forming process. And at least the edge bending roll, the first center bending roll, the first and second fin pass rolls each has a driving means provided thereon, and all the upper rolls of the first to fourth center bending rolls are set in one housing, and all the bottom roll stands of the first to fourth center bending rolls or all the bottom roll stands of the second to fourth center bending rolls are set on one common sub-base plate.

15 Claims, 38 Drawing Sheets

PRIOR ART
FIG. 18a
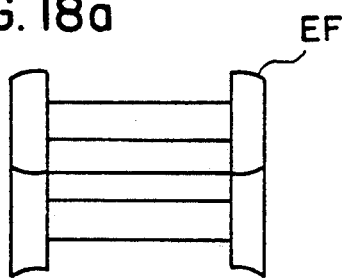
PRIOR ART
FIG. 18d
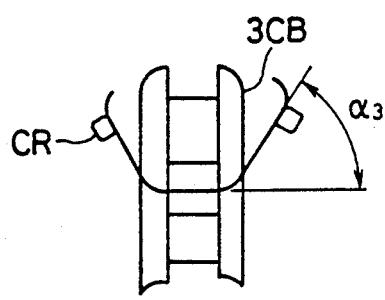
FIG. 18b
PRIOR ART
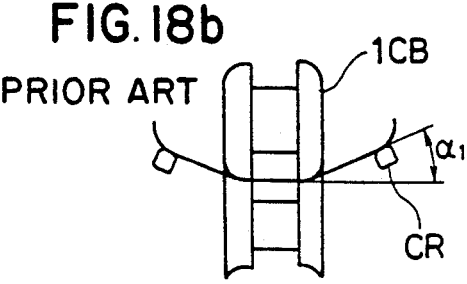
FIG. 18e
PRIOR ART
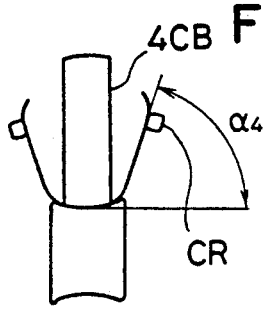
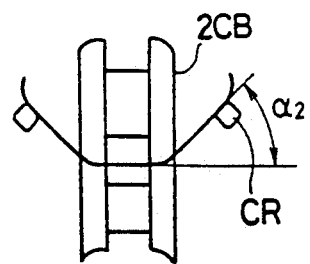
FIG. 18c
PRIOR ART
FIG. 18f
PRIOR ART

FIG.35

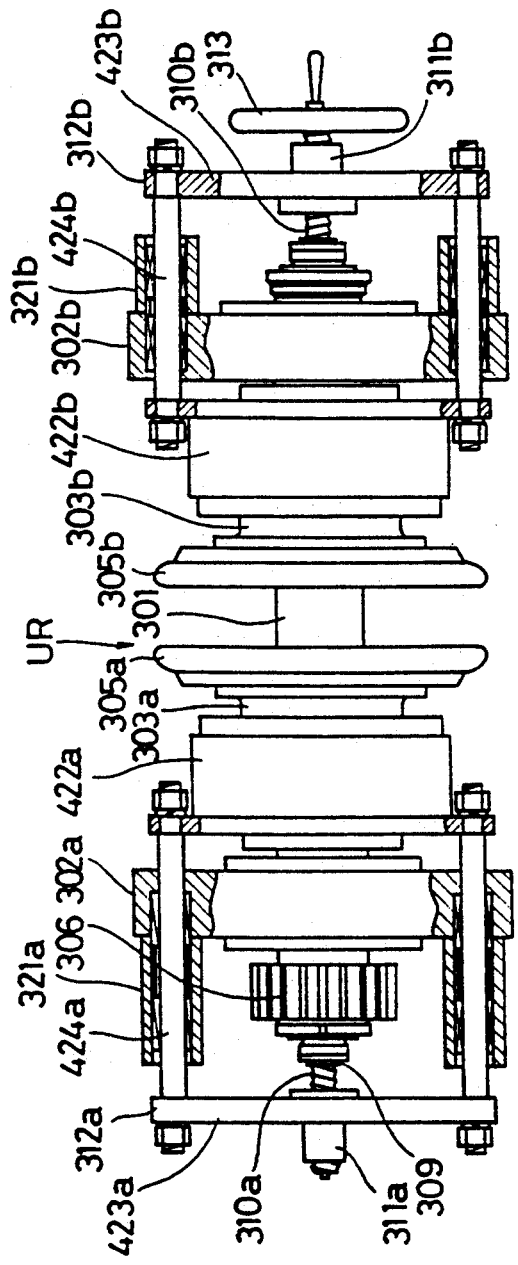
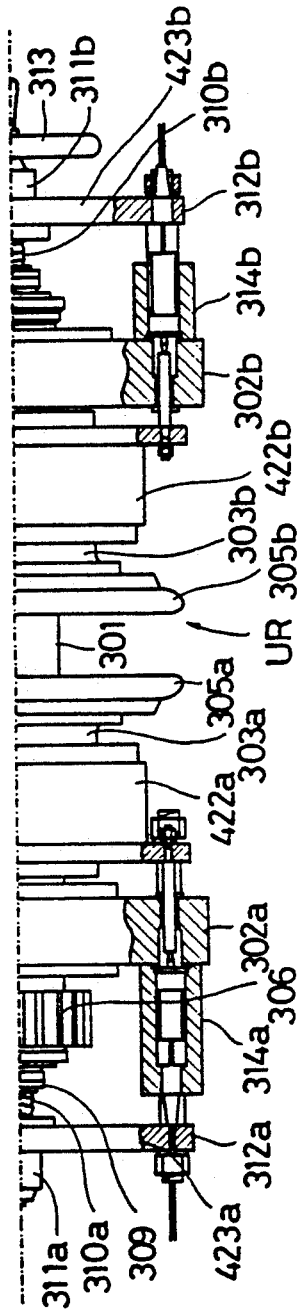
FIG. 37
FIG. 38

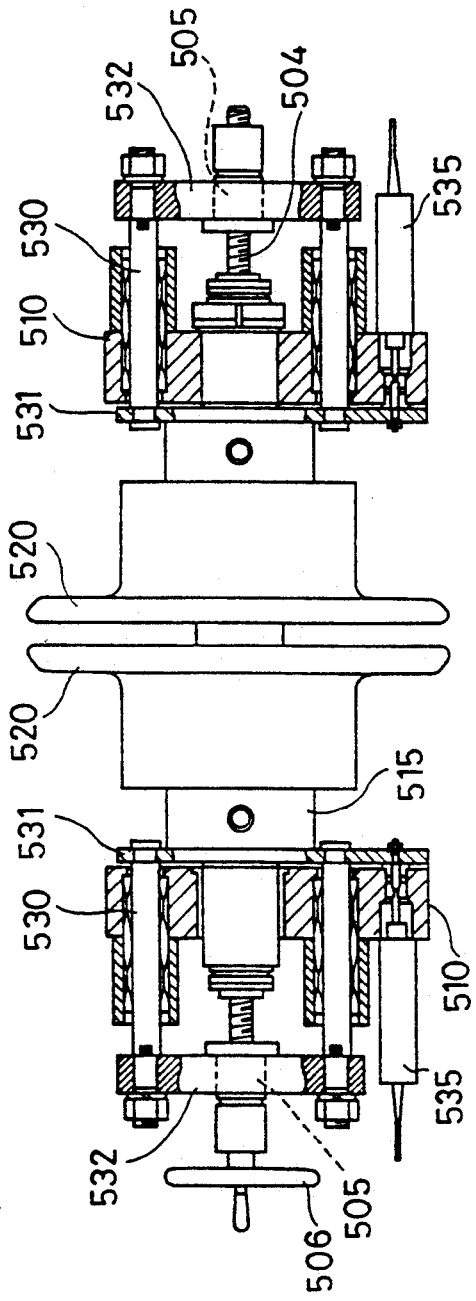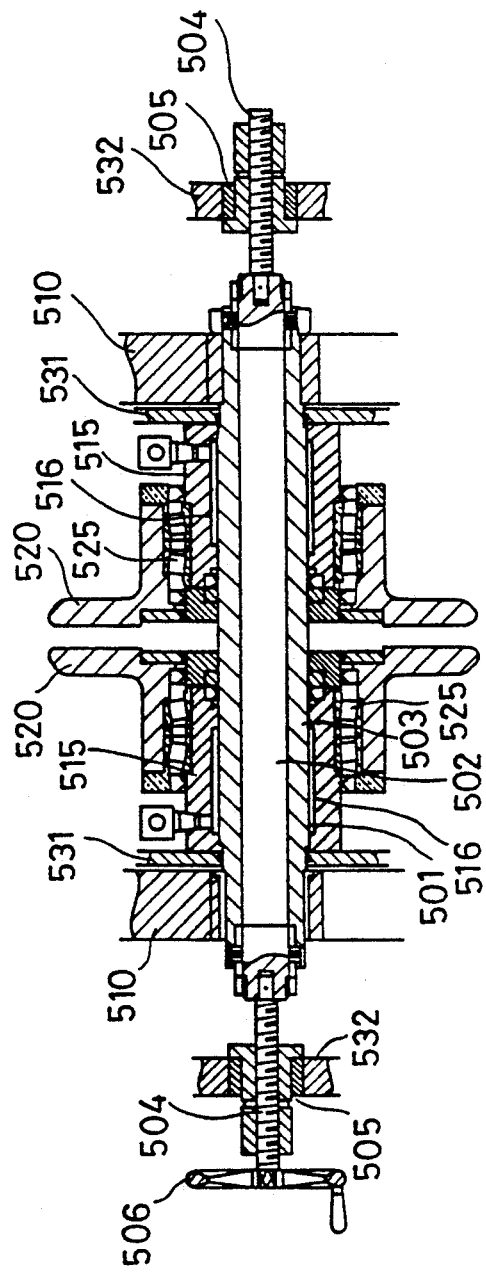

MACHINE FOR MANUFACTURING WELDED STEEL PIPES AND METHOD FOR HANDLING THE MACHINE

INDUSTRIAL FIELD

The present invention relates to a machine for manufacturing welded steel pipes, and a method for handling the machine.

BACKGROUND ART (A) Line constitution

A welded steel pipe manufactured by roll forming a steel strip to shape a pipe and welding its butted seam is already well known. Recently, an electrically seamed steel pipe manufactured by electrically (resistance) welding of a seam is mainly produced.

For one of the roll forming methods in this case, by the way, there is a whole width reduction bending method in which a strip is bent in whole, with gradually reducing its width, so as to make the whole of a pipe round. As to the forming machines belonging to this method, there are known one shown in FIG. 11 and FIG. 12, supplied by Yoda Co. in U.S.A. (disclosed in the official gazette of Japanese Patent Application Laid-open No. 29,896/1970) and another one shown in FIG. 13 to FIG. 15, supplied by Thorans Co. in U.S.A. (the official gazette of Japanese Utility Model Publication No. 28,897/1971). In the figures, the reference numeral 100 represents a pre-forming roll, 102, 104, 106 and 108: break-down rolls, 110 . . . : inner rolls, EF: an edge forming roll, CR: cage rolls, 1F, 2F and 3F: fin pass rolls, and SQ: a squeezing roll, respectively.

However, these machines have such defects as follows:
i) the number of forming rolls is large,
ii) the constraining force to a strip is weak so that the strip is apt to roll.
iii) an applicable range of use for rolls to the change in the size of pipe to be produced is narrow,
iv) the contour of a formed pipe becomes easily a discontinuous polygonal form due to the influence of rolls (See: FIG. 16), and
v) there is large load in the final stage of fin pass forming, because the bending work can not be satisfactorily carried out in the rough and intermediate forming courses, and in practice, it is required to provide at least three stages of fin pass rolls.

In order to overcome these defects, such a forming machine as shown in FIG. 17 and FIG. 18 has first been developed (the official gazette of Japanese Patent Application Laid-open No. 135,428/1986). This machine is composed so that an edge forming roll EF, first to fourth center bending rolls 1CB, 2CB, 3CB and 4CB and a large number of cage rolls CR . . . arranged on both the sides of these center bending rolls, a plurality of fin pass rolls 1F, 2F and 3F, and a squeezing roll SQ, are arranged in order from the upstream side to the downstream side, wherein the edge forming roll EF serves to bend the pipe edge portions of a strip (FIG. 18a), the first to third center bending rolls 1CB, 2CB and 3CB and the cage rolls CR . . . serve to bend the boundaries of the pipe side portions of the strip and the pipe bottom portion thereof (FIGS. 18b, c and d), the fourth center bending roll 4CB and the cage rolls CR . . . serve to bend the pipe bottom portion (FIG. 18e) so that a pipe is U-shaped in cross section (FIG. 18f), and the fin pass rolls 1F, 2F and 3F serve to further form the pipe under pressure so that the pipe side portions are protruded, and the pipe edge portions, the boundaries between the pipe edge portions and pipe side portions and the boundaries between the pipe side portions and pipe bottom portion are bent and unbent, and a welder serves to weld the resulting seam and the squeezing roll SQ serve to upset bond the said seam.

Also in this case, there are practically such defects as follows:

① Since the first to fourth center bending rolls 1CB, 2CB, 3CB and 4CB serve to bend only the boundaries between the pipe side portions and pipe bottom portion and the pipe bottom portion and they are therefor arranged at the center of the strip within a range as wide as one-third of its width (FIGS. 18b to d), and since the first to third center bending rolls 1CB, 2CB and 3CB each comprises a twin type split roll, the contact area of these rolls with the strip is small. Even if all the center bending rolls are driven, accordingly, the transmission of feed torque from the rolls to the strip can not be carried out satisfactorily, and as a result, the strip can not be made to progress smoothly.

In order to drive all the center bending rolls, it is necessary to make the machine large-scaled and it is difficult to ensure the space where the cage rolls are to be installed, also leading to the increase of installation expense.

② Since the second and third center bending rolls 2CB and 3CB each is a twin type split roll (See: FIG. 19 and FIG. 20, wherein FIG. 19 shows a case of a larger size of a pipe to be produced and FIG. 20 shows a case of a smaller one), the formation of dents and roll flaws on the strip, in particular in the split rolls of the down rolls, will be caused by their roll corners.

③ Since the first to fourth center bending rolls 1CB, 2CB 3CB and 4CB each has an independent stand structure, there are required much labor and a long time for the exchange of these rolls.

④ As to the down rolls of the second and third center bending rolls 2CB and 3CB, their roll space must be changed, in spite of the presence of the cage rolls on both the sides thereof, every time the size of a pipe to be produced is changed, and there are, namely, required much labor and a long time for the adjustment of the rolls.

⑤ Since it is necessary to provide at least three stages of fin pass rolls 1F, 2F and 3F, there are required much labor and a long time for the exchange of these rolls.

Due to consideration of these facts, the present invention is intended to provide a machine for manufacturing welded steel pipes and a method for handling the machine.

Of conventional forming stands for manufacturing electrically seamed steel pipes, these are used several stages of forming stands of the breakdown roll system or center bending roll system, in the rough and intermediate forming processes. These respective stands are independent of one another, and in each of these stands, upper and down rolls are incorporated in a common housing by way of chocks. Accordingly, the exchange of rolls in each forming stand is carried out one by one through the stand side drawing-out system or chock top drawing-out system.

In these roll exchange techniques, however, there are required much labor and a long time in such a case that most rolls must be exchanged, for instance when the size of a pipe to be produced is changed.

The present invention is intended to solve such problems in the prior art, and to improve the rate of operation.

In such a welded pipe forming machine, however, a pipe is curved down by a force applied thereto from cage rolls in the last zone L of a cage roll forming zone, and in the sledding of a strip, its pipe end does not move smoothly into the next first fin pass roll 1F, and it may move out of the pass line so that pipe forming becomes impossible. Even if the pipe end does so move, the contact of the pipe with the down roll of the first fin pass roll 1F may be too strong, leading to the easy formation of roll flaws on the pipe. When a strip is subjected to the width-reduction forming by right and left cage rolls, furthermore, its pipe bottom portion may be deformed, namely folded partly so that the pipe forming result is inferior.

The present invention is intended to eliminate such defects in the prior art, and to achieve the stable forming of pipes.

(B) Edge bending roll

As to a edge bending roll for bending the edges of a steel strip in a forming machine which bends the strip continuously, there is known the technique disclosed in the official gazette of Japanese Patent Application Laid-open No. 167,025/1983 (FIG. 34). According to this technique, an upper roll 36, of the edge bending rolls, is a pair of right and left split rolls 36a and 36b put on one shaft, wherein the pair of these split rolls 36a and 36b are such that the radius of curvature of the split roll surfaces on the mutually opposite face sides thereof, i.e. on the inner surface sides and the radius of curvature of the roll surfaces on the non-opposite face sides thereof, i.e. on the outer surface sides are different. The pair of these split rolls 36a, 36b are made to be changeable for each other in the putting position with respect to a shaft 37 so that both the inner and outer face sides of these split rolls 36a, 36b can be reversed in position. It is, therefore, possible to form strip edges for two sizes of pipes to be produced, by use of the pair of these split upper rolls 36a, 36b together with down rolls 1.

A strip edge forming roll for a welded steel pipe serves to pass a strip while it is held between both the upper and down rolls, thereby forming on the edges of the strip a curved portion corresponding to the size of a pipe to be produced. It is, therefore, necessary to exchange the said rolls, every time the size of a pipe to be produced is changed. Such roll exchange requires much labor in proportion to the sizes of pipes to be produced.

The present invention is intended to provide an edge bending roll for welded steel pipes, in which the above problems are solved.

(C) Split forming roll adjusting device

A roll forming machine in a welded steel pipe manufacturing line for working a steel strip continously comprises upper rolls and down rolls as the forming rolls, in which a steel strip is passed between the rolls so as to be bent in the so-called flower form. If the forming roll is exchanged every time the size of a pipe to be produced is changed, there are required a large number of forming rolls different in size, and their exchange is not easy, leading to increase of cost. Recently, a split roll system has been, therefore, mainly used.

This split roll system is such that the forming roll is composed of split members divided right and left into two parts, i.e. split rolls, wherein the size of a pipe to be produced can be changed by adjusting the space between the split rolls. As to an adjustment means therefor, there are known, for instance one of having a helical adjustment mechanism, disclosed in the official gazette of Japanese Patent Application Laid-open No. 28,627/1982 and another of exchanging a spacer between split rolls, disclosed in the official gazette of Japanese Patent Application Laid-open No. 209,722/1982.

However, the former adjustment means is composed such that the horizontal main shaft thereof is a screw in itself and a pair of nuts screw-engaged with the said screw, wherein a pair of split rolls movably mounted on the main shaft are moved in the axial direction, respectively, by screw-moving the said nuts, so that the space between the split rolls can be adjusted. Accordingly, there is a large possibility of such a risk that the main shaft may be damaged due to the concentration of stress, when any large load is applied to the split rolls. Furthermore, the former adjustment means is not suitable, in particular in the case of manufacturing pipes from a thin sheet, in which high accuracy is required, because it has no backlash adjustment mechanism.

The latter adjustment means is such that a spacer is made to intervene between a pair of right and left split rolls and the said spacer is exchanged with one different in size at need. Every time the spacer is exchanged, accordingly, there are required so much labor and long time, because it is necessary to detach a main shaft from the machine and to detach the split rolls and the spacer from the main shaft, and then to assemble the split rolls and another spacer different in size in place of the old one and incorporate them into the machine.

The present invention is intended to solve such problems in the prior art and to stabilize the quality of the product.

(D) Upper roll actuating apparatus

An upper roll which serves to cause a strip to progress as it is held between the upper roll and a down roll whereby it is gradually shaped into a tubular form, is provided so as to be adjustable in vertical position, in order that the roll surface of the said upper roll is made to accord with a pass line for strips different in thickness and the strips are pressed down. The upper roll actuating apparatus therefor is usually provided so that screw shafts are provided standingly from the chocks at both the ends of an upper roll put-on shaft, and these screw shafts are incorporated in the worm jucks at both the right and left portions of a worm shaft supported on a stand, whereby the upper roll can be moved up and down, with the rotation of the worm shaft in both the normal and reverse directions. The elimination of backlash in this appararus will be carried out by use of a special oil-hydraulic jack provided between the chocks at both the ends of a down roll put-on shaft and the chocks of the upper roll put-on shaft.

As to the elimination of backlash in such a conventional apparatus as mentioned above, there are such defects that it is difficult to carry out the elimination of backlash, because the space between both the upper roll put-on shaft and down roll put-on shaft is narrow, and it is necessary to detach and attach the oil pipings of the said oil-hydraulic jack, when a stand on the movable side is taken off or mounted on these roll put-on shafts, for exchange of the rolls.

The present device is intended to eliminate such defects as mentioned above, and to carry out properly the elimination of backlash.

(E) Cage rolls

In general, for the cage roll forming an electrically seamed steel pipe, there has been hitherto used such a forming machine as shown in FIG. 47 and FIG. 48. This machine is composed so that a plurality of inner rolls 110 . . . , whose roll widths are smaller in order, are arranged from the upstream side to the downstream side, and a large number of outer rolls, i.e. cage rolls CR . . . , CR . . . are arranged on both the sides of the said inner rolls, at heights and directions fitting to the forming situations, wherein a strip fed therein is gradually bent into a U-shaped form, and further into a circular form by applying force to the strip from the inside and the outside by these rolls.

As to the cage rolls CR . . . , CR . . . of the prior art, by the way, there are two types, as shown in FIG. 49 to FIG. 50, one whose roll surface is of a flat face (for example, disclosed in the official gazettes of Japanese Utility Model Publication No. 19,371/1987 and Japanese Patent Application Laid-open No. 174,216/1985) and the other whose roll surface is of a convexly curved face (for example, in the official gazette of Japanese Patent Application Laid-open No. 202,122/1984). Both of them can be applicable to various sizes of pipes to be produced.

In these cage rolls, however, there are such defects of making the roll-contacted portion of a formed steel pipe flat in a stripe-pattern so that its good appearance is strikingly ruined and its commercial value is decreased. In particular, the latter of the two types of cage rolls is excessively defective.

The present invention is intended to eliminate these defects in the prior art.

DISCLOSURE OF THE INVENTION (A) Line constitution

According to a first aspect of the present invention, there is provided a machine for manufacturing welded steel pipes, in which a strip is continuously roll-formed to shape a pipe and its butted seam welded, and which is characterized in that an edge bending roll for constraining under pressure a strip from its pipe edge portions to the boundaries between the pipe edge portions and its pipe side portions to bend the strip; a first center bending roll for constraining under pressure the pipe side portions to bend the pipe side portions, a second, third and fourth center bending rolls for constraining under pressure the strip from the boundaries between the pipe side portions and its pipe bottom portion to the pipe bottom portion to apply lateral pressure to the pipe from both sides to bend the boundaries and the pipe bottom portion having a plurality of cage rolls arranged on both the sides of these center bending rolls; first and second fin pass rolls for further forming under pressure the pipe arranged in order from the upperstream side to the downstream side of a roll forming process, wherein at least the edge bending roll, the first center bending roll, the first and second fin pass rolls each has a driving means provided thereon, and all the upper rolls of the first to fourth center bending rolls are set in one housing, and all the down roll stands of the first to fourth center bending rolls or all the down roll stands of the second to fourth center bending rolls are set on one common sub-base plate.

According to a second aspect of the present invention, there is provided a machine for manufacturing welded steel pipes of the first aspect, in which both the upper roll and bottom roll of the edge bending roll and the first center bending roll are made to be a split roll adjustable in width. The bottom roll each of the second to fourth center bending rolls is made to be a caliper-shaped one-part roll fitting to the maximum pipe diameter of an applicable common range of use, the upper roll of each of the second and third center bending rolls is made to be a split roll adjustable in width, and the upper roll of the fourth center bending roll is made to be a one-part roll applicable for common use. The cage rolls are mounted so as to be adjustable for slant advance and retreat.

According to a third aspect of the present invention, there is provided a method for handling a welded steel pipe manufacturing machine, in which the first to fourth center bending rolls are arranged in order in an intermediate roll-forming process, and all the upper rolls of these center bending rolls are set in one housing, and which is characterized in that all the upper rolls of the first to fourth center bending rolls are exchanged at a stroke by exchanging the housing.

According to a fourth aspect of the present invention, there is provided a method for handling a welded steel pipe manufacturing machine, which is characterized in that all the bottom roll stands of first to fourth center bending rolls or all the down roll stands of second to fourth center bending rolls are set on one detachable common sub-base plate, and all the down rolls of the first to fourth center bending rolls are exchanged at a stroke together with the said common sub-base plate.

In addition, the upper roll may be driven or not in the edge bending roll, and only each bottom roll may be driven in the second to fourth center bending rolls.

By virtue of the abovementioned embodiment, a strip of a predetermined size may be preferably fed from the upstream side to the downstream side, for the manufacture of a steel pipe. The strip will be, accordingly, dealt with, as follows:

I. By the edge bending roll, a strip from its pipe edge portions to the boundaries between the pipe edge portions and its pipe side portions is constrained under pressure so as to be bent. The bending in this stage may be such that the pipe edge portions and the boundaries are bent almost equally to a finally formed circle.

II. By the first center bending roll, the pipe side portions are constrained under pressure so as to be bent. The bending in this stage may be slight.

III. By the second to third center bending rolls, the boundaries between the pipe side portions and pipe bottom portion are constrained under pressure, and at the same time, by the plurality of the cage rolls arranged on both the sides thereof, lateral force is applied to both the sides of the pipe so that the same boundaries are bent. The bending in this stage may be in excess of that for providing the finally formed circle.

IV. By the fourth center bending roll, the pipe bottom portion is constrained under pressure, and at the same time, by the plurality of the cage rolls arranged on both the sides thereof, lateral force is applied to both the sides of the pipe so that the pipe bottom portion is bent. The bending in this stage may be in such extent of providing the finally formed circle or in excess.

V. By the first and second fin pass rolls, the pipe (which has become oval-shaped in cross section, by the bending work to the above stepe IV) is further formed under pressure so that the pipe side portions are protruded sideway, and the respective boundaries and pipe edge portions are properly bent and unbent so that the pipe becomes nearly a circle, VI. Then, the resulting seam is properly welded and the shape of the pipe is corrected, thereby obtaining a welded steel pipe.

According to a fifth aspect of the present invention, there is provided a machine for manufacturing welded steel pipes of the first aspect, in which in the first to fourth center bending rolls, each upper roll mounted on an upper roll common stand frame and each bottom roll mounted on a bottom roll common stand are made individually liftable, respectively.

According to a sixth aspect of the present invention, there is provided a method for menufacturing welded steel pipes of the third aspect, in which the upper roll common stand frame of the first to fourth center bending rolls has a positioning means and a clamping means provided thereon, and in the exchange of rolls, the clamping means is released to disengage the common stand frame, and then a new common stand frame is inserted, and set at a predetermined position by actuating the positioning means and clamping means.

According to a seventh aspect of the present invention, there is provided a method for handling a welded steel pipe manufacturing machine of the fourth aspect, in which the bottom roll common stand frame of the first to fourth center bending rolls has a positioning means and a clamping means provided thereon, and in the exchange of rolls, the clamping means is released to disengage the common stand frame, and then a new common stand frame is inserted, and set at a predetermined position by actuating the positioning means and clamping means.

Due to the abovementioned constitution, the exchange of each upper roll and the exchange of each bottom roll may be preferably carried out together with a common stand frame at a strock. In addition, the vertical adjustment of each upper roll and each bottom roll may be preferably carried out individually.

According to a eighth aspect of the present invention, there is provided a machine for manufacturing welded steel pipes of the first aspect, in which a bottom guide roll for receiving the pipe is arranged in a section between the fourth center bending roll and the first fin pass roll.

Due to the abovementioned constitution, a bottom guide roll serves to support a pipe bottom portion at the final stage of a cage roll forming course, thereby preventing a pipe from being curved down so that the pipe can be made to keep on a normal pass line and it can be properly guided to the fin pass roll of a next stage.

(B) Edge bending roll

According to a ninth aspect of the present invention, there is provided an edge bending roll for use in the welded steel pipes manufacturing machine of the first aspect, in which the bottom roll and upper roll thereof each is made to be a pair of split rolls symmetrical right and left, said bottom roll is made is be a stepped roll having plural steps different in outside diameter in which the inner side has a smaller, wherein concavely curved portions different in radius of curvature are provided respectively in the portion of each step opposite to the edges of a strip, and in said upper roll, the contour of its outer peripheral profile in a plane including the roll center axis is such that only the outer face side of the roll has a convexly curved form, the upper roll is journaled in a holder so that its setting position can be changed to a position opposite to each step of the said stepped roll, and the convexly curved form of the upper roll comprises a combination of sectors different in radius of curvature, and the upper roll holder has a function of inclining the upper roll in the breadth direction of the strip.

According to a tenth aspect of the present invention, there is provided an edge bending roll of the ninth aspect, in which the center of inclination of the upper roll is set on the normal line erected at the end of the convexly curved face of the upper roll.

According to a eleventh aspect of the present invention, there is provided an upper roll supporting apparatus for the edge bending roll of the ninth aspect, which comprises a lifting frame supported liftably in a housing, an upper roll supporting frame supported on the lifting frame movably in the breadth direction of the upper roll, an upper roll holder supported for inclination on the upper roll supporting frame, a jack device provided between the upper roll supporting frame and the upper roll holder for inclining the upper roll holder, a cylinder device for pressing the lifting frame in the direction of the forming reaction force, and a cylinder device for pressing the upper roll holder in the direction of the forming reaction force.

According to the present invention described above, the bottom rolls 1a, 1b and upper rolls 36a, 36b are such that the space adjustment between the upper and bottom rolls can be carried out fitting to the width of a strip 4. In order that the roll surface height is made to accord with the pass line height, furthermore, the bottom and upper rolls are made adjustable in position in the vertical direction.

The bottom is roll made to be a stepped roll having plural steps different in outside diameter in which the inner side has a small diameter, wherein concavely curved portions different in radius of curvature are provided respectively in the portion of each step opposite to the edge of a strip. As a result, the bottom roll can be used for various kinds of strips.

In the upper roll, the contoure of its outer peripheral profile in a plane including the roll center axis is such that only the outer face side of the upper roll has a convexly curved form, but omitted on the inner side thereof. Thus, the upper roll can be made thin in roll thickness, and the roll holder thereof can be made thick and high in rigidity.

The upper roll is journaled in this holder, and the upper roll can be exchanged opposite to each of the caliper steps of the stepped roll by being drawn out of the bearings. Accordingly, the upper roll can be fitted to various strips different in width and thickness.

By virtue of this roll, the rigidity of the mill will be increased and the bending of strip edges will be sharply improved as compared with the prior art, without ruining the usability of the roll.

The convexly curved portion of the upper roll is shaped in the form comprising a combination of sectors different in radius of curvature, and on the other hand, the roll surface of the upper roll is made capable of being inclined in a direction shown at an angle of $\alpha$ in the breadth direction of the strip, as shown in FIG. 30.

Due to this inclination, it becomes possible to use the upper roll different in radius of curvature, with no exchange of roll.

(C) Split forming roll adjusting device

According to a twelfth aspect of the present invention, there is provided an adjusting device for a driven forming roll, for use in the welded steel pipe manufacturing machine of the first aspect, in which the structure of a driven forming roll such as the bottom roll of the edge bending roll, and the upper and bottom rolls of the first center bending roll is composed so that on the outer periphery of the middle portion of a hollow main shaft journaled on both the sides, a pair of right and left cylindrical roll holders are put slidably in the axial direction, and a position retaining means is provided for retaining the roll holders at an optional position, and a pair of right and left split forming rolls are in both the holders at their inner ends, respectively, a gear for mechanically engaging the main shaft to a driving unit is fixed at one end of the main shaft, and further an adjustment shaft is rotatably put running through the hollow inside of the said main shaft, a pair of threaded portions different in the thread direction are provided at both the ends of the adjustment shaft and screw-movers are engaged for screw-advance and retreat with both the said threaded portions, a transmission mechanism for transmitting the said screw-advance and retreat is provided between one screw-mover and one roll holder and between the other screw-mover and the other roll holder, and a handle for rotation is provided at a proper position on the said adjustment shaft.

If a handle is rotated clockwise or counterclockwise, after a position retaining means is released to make a roll holder slidable, due to the above-mentioned embodiment, an adjustment shaft is followed therewith so that screw-movers on both sides are screw-advanced or retreated mutually in the reverse directions and both the holders are followed therewith by way of transmission mechanisms, whereby split forming rolls are approached to or alienated from each other.

After the space of the split forming rolls is adjusted in such a manner as mentioned above, the position retaining means is caused to work again, thereby constraining the position of both the roll holders, i.e. the position of the split forming rolls.

To the split forming rolls whose space has been adjusted, a rotating force is supplied from a driving apparatus. This rotating force is transmitted to gears and then transmitted to the split forming rolls by way of the main shaft and both of the holders.

According to a thirteenth aspect of the present invention, there is provided an adjusting device for a non-driven forming roll, for use in the welded steel pipe manufacturing machine of the first aspect, in which the structure of a non-driven forming roll such as each upper roll of the second to third center bending rolls is composed so that both the right and left portions of a main shaft formed by putting an outer cylinder shaft rotatably on the outer periphery of a core shaft are fixed on supporting plates; a pair of right and left sliding sleeves with a positioning mechanism are put on the middle portion of the said main shaft so as to be slidable in the axial direction, and a pair of right and left split rolls are put rotatably on the outer peripheries of the said sleeves, respectively; and screw shafts which are mutually in a reverse screw relation are provided projectingly from both the ends of the said core shaft; nuts screw-engaged with both screw shafts and the said sliding sleeves are connected with each other by rods and a core shaft-rotating means is attached on the end of the said screw shafts.

By rotating handle 506 in the right direction from the situation illustrated in the drawings in FIG. 41 and FIG. 42, core shaft 502 is rotated with respect to outer cylinder shaft 503 fixedly supported at both its ends on supporting plates 510. Then, nuts 505 connected with sliding sleeves 515 which do not rotate with respect to the outer cylinder shaft by rods 530 are screw-advanced toward the supporting plates 510, because their screw shafts 504 are mutually in reverse screw relation. Accordingly, the sliding sleeves 515 are pushed by the rods 530 so as to move together with split rolls 520 in such a direction that they approach to each other. And, reversely rotating the handle 506, the nuts 505 are screw-retreated to alienate the split rolls from each other. The outer cylinder shaft 503 and the sliding sleeves 515 can be fixed by actuating a positioning mechanism at a position where the space between the split rolls is fitted to the width of the strip to be shaped into a tubular form. If the strip is held between the upper and bottom split rolls at the same position, it is deformed into a tubular form, as it is caused to progress.

(D) Upper roll actuating apparatus

According to a fourteenth aspect of the present invention, there is provided a backlash eliminating means in the upper roll actuating apparatus for the edge bending roll, center bending rolls and fin pass rolls, for use in the welded steel pipe manufacturing machine of the first aspect, in which a screw shaft is erected from second chocks supporting both the ends of an upper roll put-on shaft respectively. Each of these screw shafts is incorporated in worm jacks at both the right and left portions of a worm shaft supported on a stand. An upper roll actuating apparatus is provided for making the upper roll movable up and down by way of the screw shafts by the rotation of the worm shaft in both the normal and reverse directions. A fluid-hydraulic cylinder is provided above both the screw shafts, and the piston rods of the cylinders are connected with the upper ends of both the screw shafts so that the upper roll can be pulled up.

In FIG. 43, the up and down movements of upper roll 605 are carried out with the rotation of worm shaft 613 caused by reversible motor 616 in both the normal and reverse directions. When the worm shaft is rotated in the normal direction, screw shafts 608 are caused to go down by the actuation of worm jacks 614, thereby causing the upper roll 605 to go down, and reversely when the worm shaft is rotated in the reverse direction, the worm jacks are actuated in the reverse direction, thereby causing the upper roll to go up by way of the screw shafts. The backlash elimination of the worm jacks is carried out by pulling up the said screw shafts 608 by the actuation of fluid-hydraulic cylinders 617.

The pulling-up force of the said fluid-hydraulic cylinders may be preferably set to be the sum of the tare of the pulling-up portions, i.e. the screw shaft 608, the second chock 607, the upper roll put-on shaft 606 and the upper roll 605 in an embodiment shown in FIG. 43, or the screw shaft 608, the suspension base plate 628, the arms 629, 629, the upper roll put-on shaft 606 and the upper roll 605 in another embodiment shown in FIG. 3, and 10%~20% of the strip forming load.

(E) Cage rolls

According to a fifteenth aspect of the present invention, there is provided a cage roll for use in the welded steel pipe manufacturing machine of the first aspect, in which the roll surface thereof is shaped in the form of a concavely curved face having a larger radius of curvature than that of a forming flower at its own position.

Due to the abovementioned embodiment, the roll surface shaped in the form of a concavely curved face serves to form under pressure a strip to be bent, as it is wrapped. Namely, this roll surface is suitably fitted to the convexly curved face of a forming flower, so that

BRIEF DESCRIPTION OF THE DRAWINGS

FIG. 2 is a side view of the machine in a roll forming process, FIG. 3 is a front view of the first center bending roll, FIG. 4 is a front view of the third center bending roll, FIG. 5 is a front view of the fourth center bending roll, FIG. 6 is a plan view of the cage roll, FIG. 7 is an enlarged front view of the main part of the first center bending roll, FIG. 8 and FIG. 9 are enlarged front views of the main parts of the second to fourth center bending rolls, for a small size of a pipe to be produced and for a large size, and FIG. 10 is a graph.

FIG. 11 to FIG. 20 show prior art examples, FIG. 11 is a plan view of the constitutional essentials of a first prior art example, FIG. 12 is an enlarged cutaway front view of the main part of the same example, FIG. 13 is a perspective view of a second prior art example, FIG. 14 is a sectional view taken along the line XIV—XIV of FIG. 13, FIG. 15 is a sectional view taken along the line XV—XV of FIG. 13, FIG. 16 is an illustrative view of the main parts of the first and second prior art examples, FIG. 17 is a plan view of the constitutional essentials of a third prior art example, FIG. 18a-f are views of the main parts taken along the lines a—a through f—f of FIG. 17, and FIG. 19 and FIG. 20 each is an enlarged front view of the main part of the center bending roll of the same example.

Figure 35:
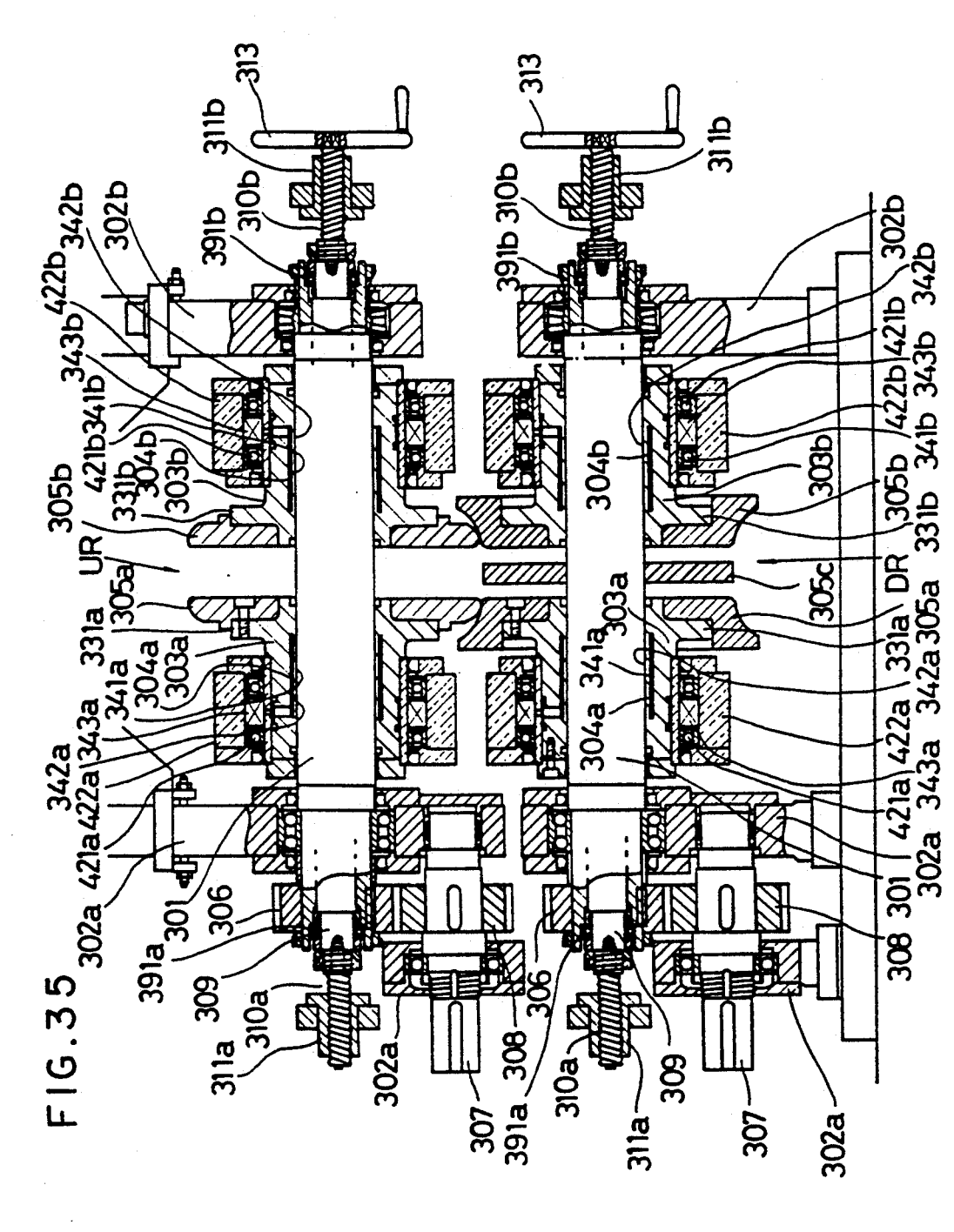

FIG. 35 is a cutaway front view; FIG. 37 is a cutaway plan view; taken along the line A—A of FIG. 35. FIG. 38 is a semi-cutaway plan view, taken along the line B—B of FIG. 36.

FIG. 41 is a plan view of the device according to the present invention, and FIG. 42 is a cross-sectional view thereof, taken from the front.

FIG. 47 to FIG. 52 show an prior art example, wherein FIG. 47 is a plan view illustrative of the constitutional essentials of a forming machine, FIG. 48 is a sectional view taken along the line VI—VI of FIG. 47, and FIG. 49 to FIG. 52 are views illustrative of the operation.

BEST MODE FOR CARRYING OUT THE INVENTION (A) Line constitution

The machine according to the present invention is shown in FIG. 1 to FIG. 9.

Figure 1:
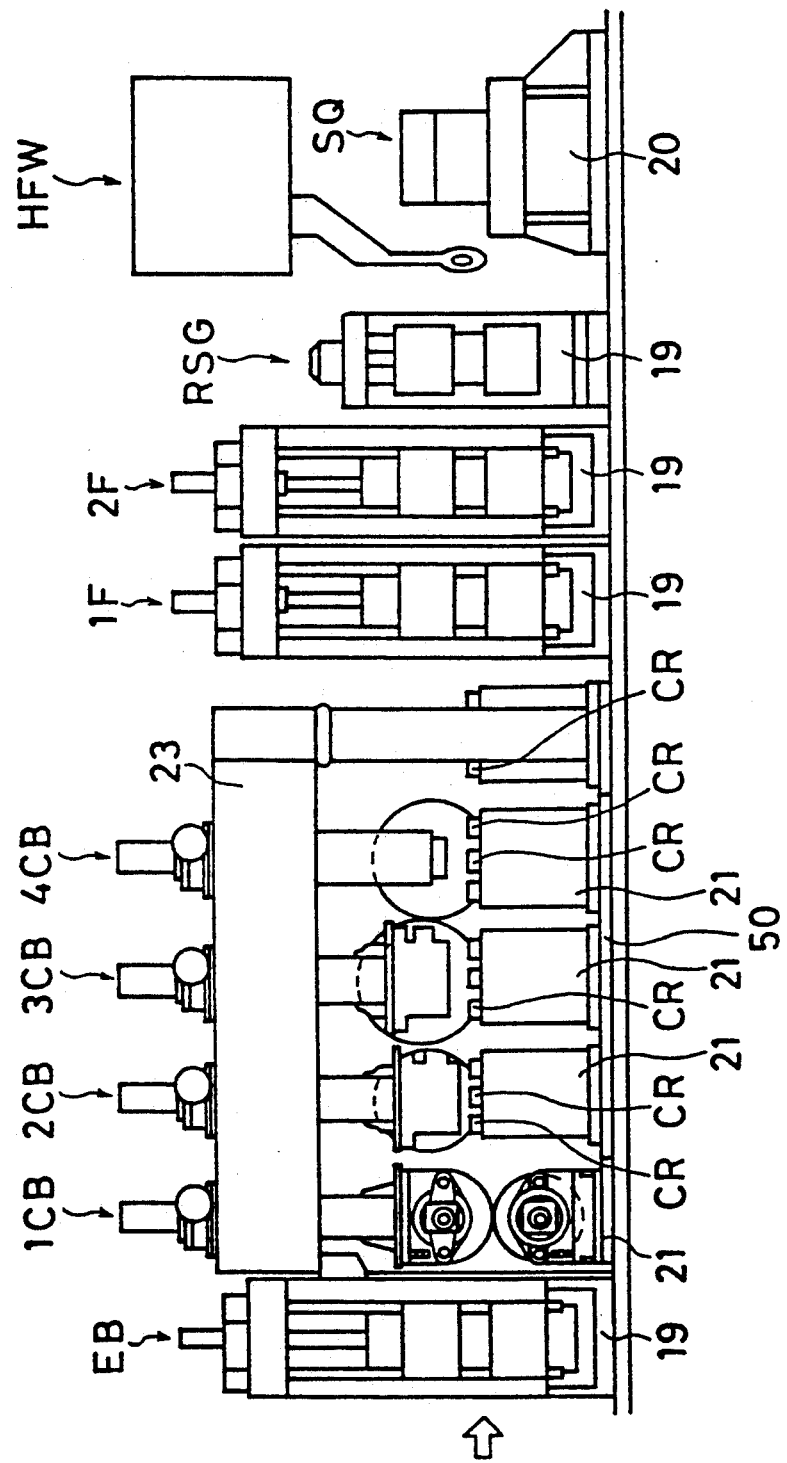
FIG. 1 is an illustrative view of the embodiment of a welded steel pipe manufacturing machine according to the present invention.

As shown in FIG. 1, this machine is composed so that an edge bending roll EB, first to fourth center bending rolls 1CB, 2CB, 3CB and 4CB, a plurality of cage rolls CR.; arranged on both the sides from the second center bending roll to the downstream side of the fourth center bending roll. First and second fin pass rolls 1F and 2F, a rotary seam guide roll RSG, a high frequency welder HFW and a squeezing roll SQ, are arranged in order from the upperstream side to the downstream side.

Of these rolls, in further detail as shown in FIG. 2 to FIG. 9, the edge bending roll EB, the first to fourth center bending roll 1CB, 2CB, 3CB and 4CB and the first and second fin pass rolls 1F and 2F, each comprises an upper roll U and a bottom roll D, and the plurality of the cage rolls CR . . . and the squeezing roll SQ each comprises a pair of right and left rolls. The first to fourth center bending rolls 1CB, 2CB, 3CB and 4CB each is given a predetermined range of use. Providing that steel pipes, 22.22 mm~60.5 mm in outer diameter, are manufactured, for instance, as shown in FIG. 10, three sets of roll groups ①, ② and ③ will be provided for which have applicable ranges of use:

① 22.22 mm~31.03 mm,
② 31.03 mm~43.33 mm,
③ 43.33 mm~60.5 mm.

In addition, although a side roll SD is arranged between the first and second fin pass rolls, it may be omitted.

Of these rolls, the bottom roll D of the edge bending roll EB, the upper and bottom rolls U and D of the first center bending roll 1CB, the upper and bottom rolls U and D of each of the first and second fin pass rolls 1F and 2F, each has a driving means 27 provided thereon. Concretely, their roll shaft is mechanically connected with a driving source by way of a universal joint. If necessary, the upper roll U of the edge bending roll EB, the bottom roll D . . . of each of the second to fourth center bending rolls 2CB, 3CB and 4CB, and the squeezing roll SQ can be driven.

Both the upper and bottom rolls of the edge bending roll EB are made to be a split roll and adjustable in width in accordance with the size of a pipe to be produced. The edge bending roll EB serves to constrain under pressure a strip from its pipe edge portions to the boundaries between the pipe edge portions and its pipe side portions so that the strip is fed, and at the same time, the pipe edge portions and the boundaries are bent almost equally to a finally formed circle, white anticipating the spring-back.

Figure 3:
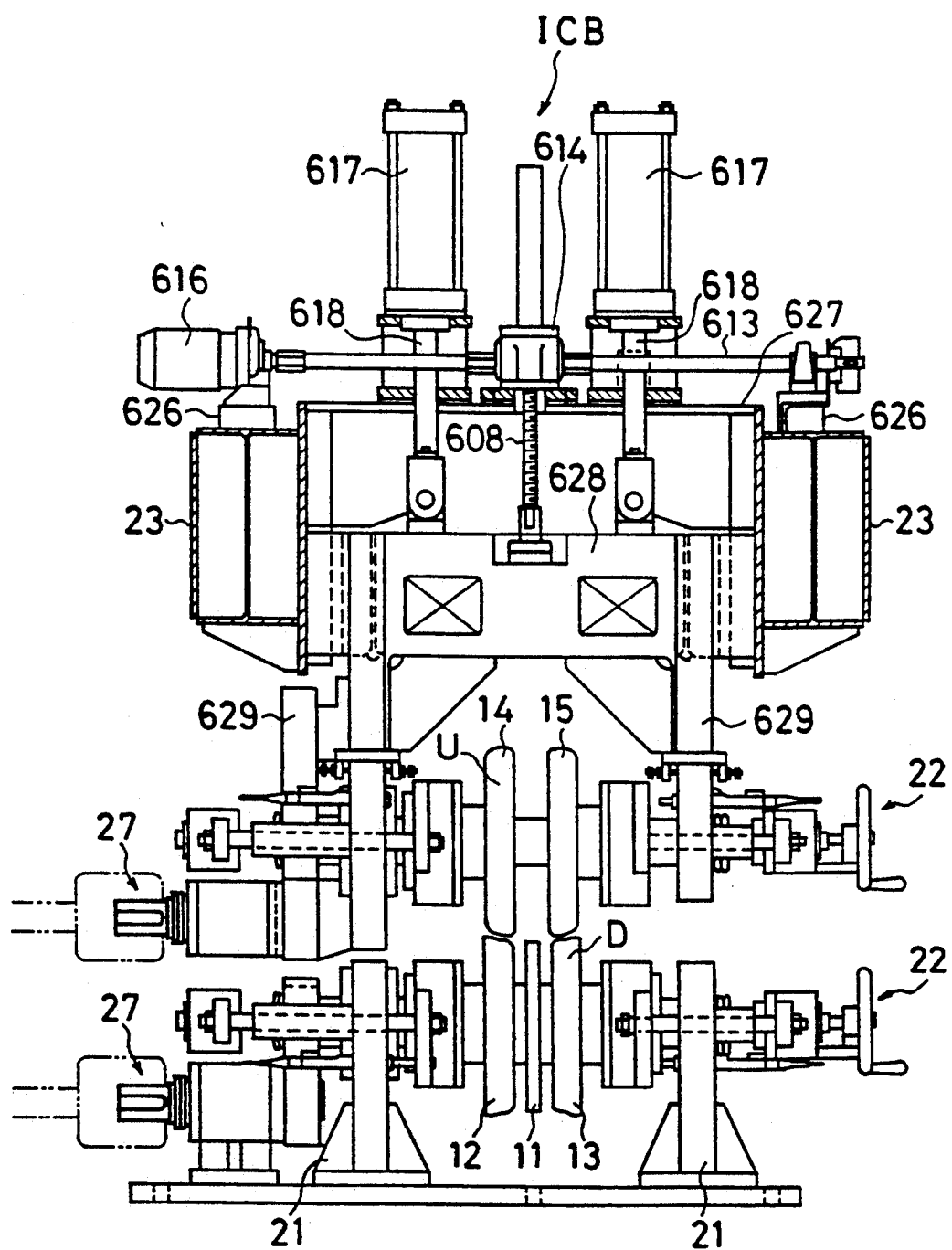
Figure 7:
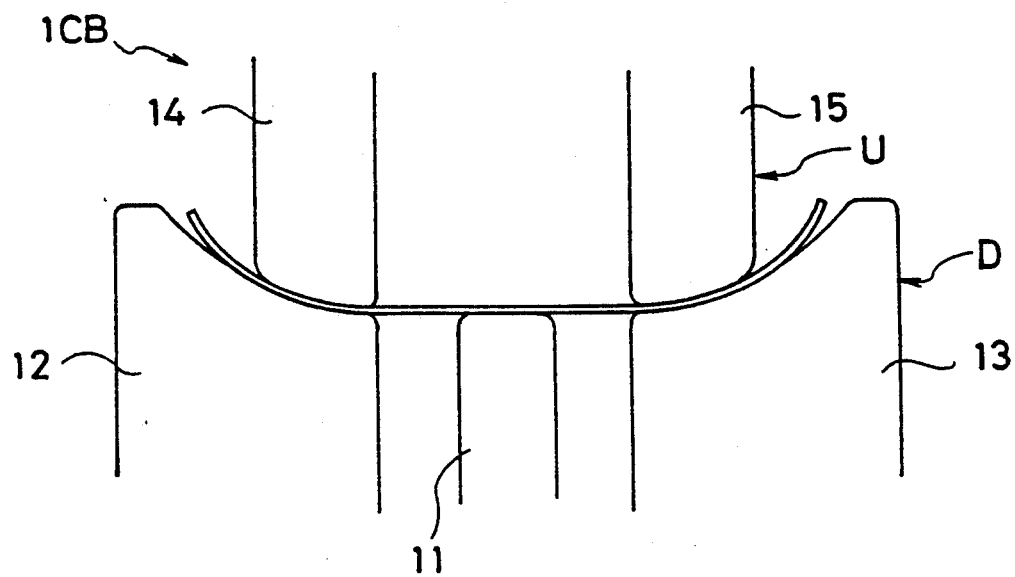

As to the first center bending roll 1CB, as shown in FIG. 3 and FIG. 7, its bottom roll D is made to be a split roll comprising three parts, i.e. comparatively wide right and left members 12 and 13 and a comparatively narrow intermediate member 11, and its upper roll U is made to be a split roll comprising two parts, right and left members 14 and 15, wherein the upper and bottom rolls each has a width-adjusting means 22, so as to be adjustable in width in accordance with the size of a pipe to be produced. The first center bending roll 1CB serves to constrain under pressure the pipe side portions of the strip so that the strip is fed, and at the same time it is bent slightly. The bending extent in this stage may be such that the caliper radius at an intermediate point within a range of the size of a pipe to be produced (the outside diameter of a pipe) applicable for this roll is about 2.5 times as the caliper radius of the squeezing roll SQ fitting thereto.

Figure 4:
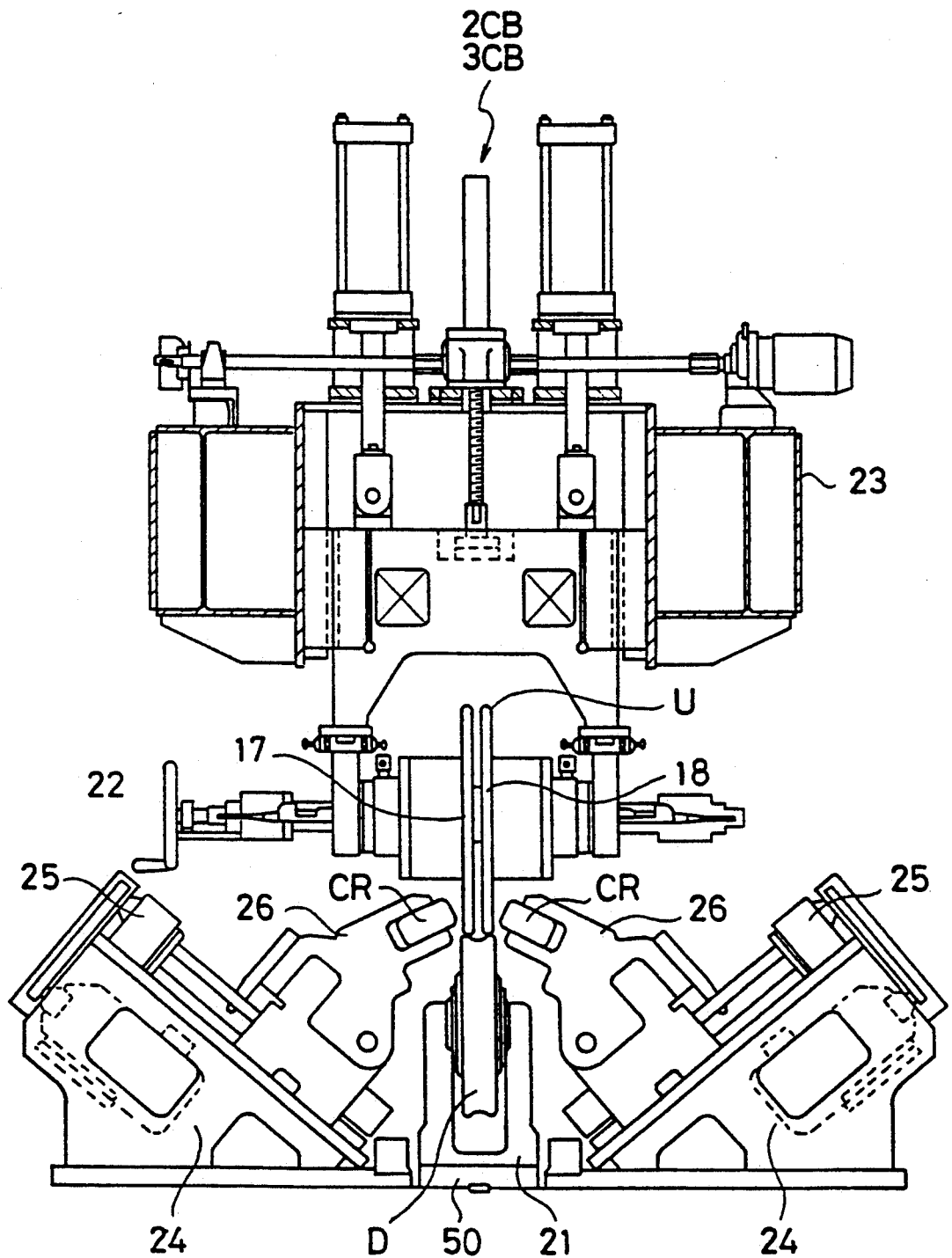
Figure 5:
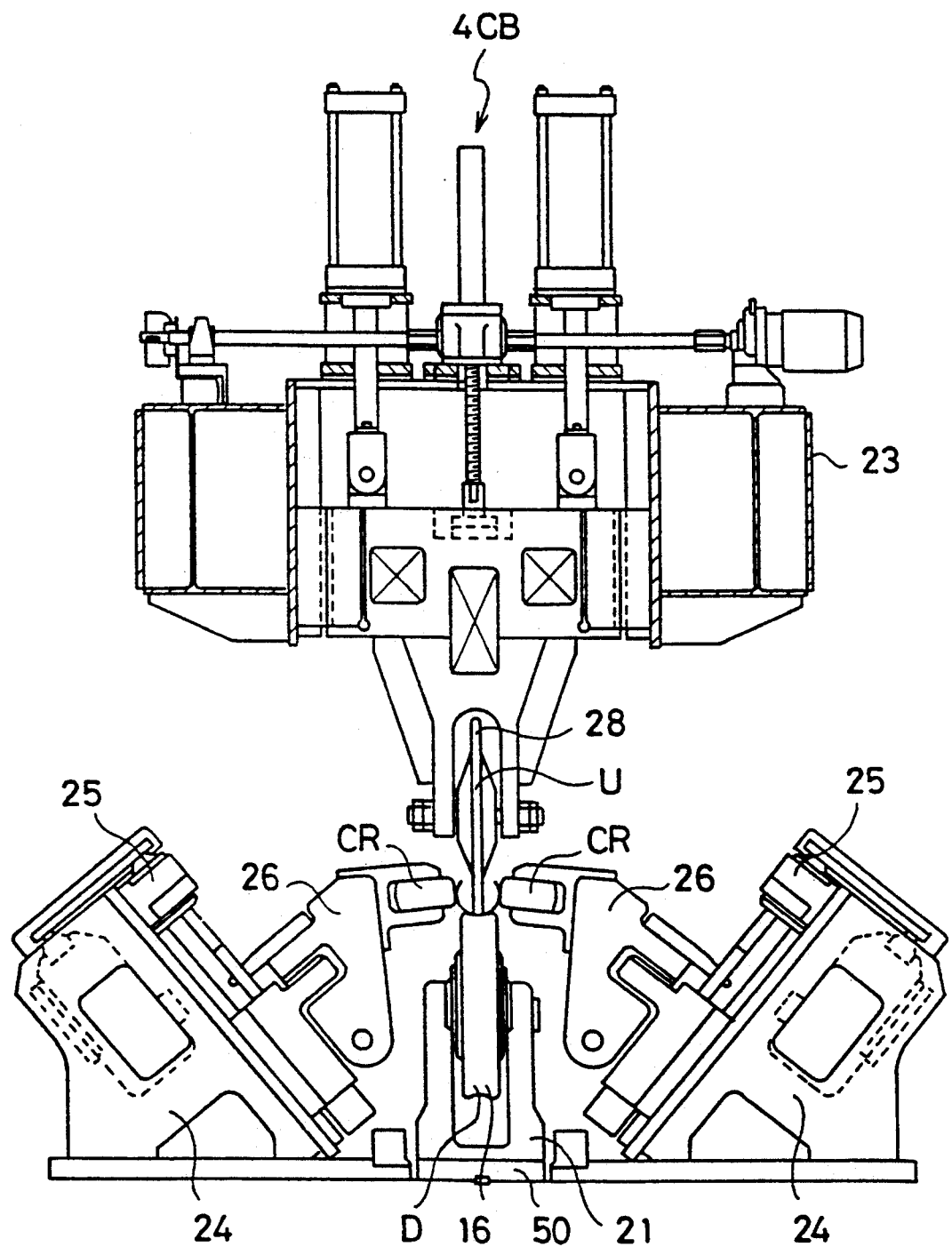
Figure 8:
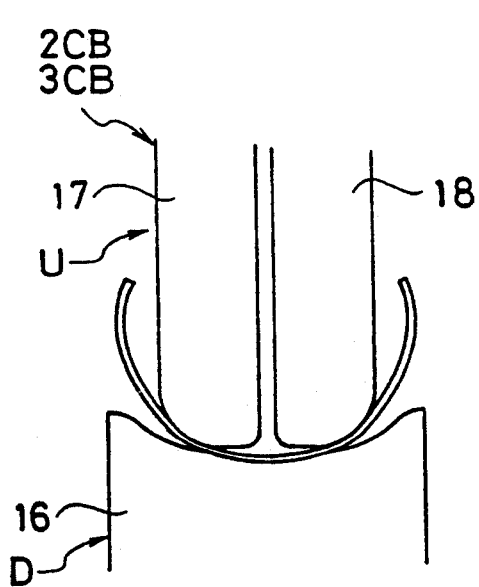

As to the second to fourth center bending rolls 2CB, 3CB and 4CB, as shown in FIG. 4, FIG. 5 and FIG. 8 (FIG. 9), their bottom rolls D each is made to be a one-part roll 16, which is used for a predetermined range of the size of a pipe to be produced. Providing that there are three use ranges, ① 22.22 mm~31.03 mm, ② 31.03 mm~43.33 mm and ③ 43.33 mm~60.5 mm, as mentioned above, three one-part rolls for the use ranges ①, ② and ③ will be provided for. The first one-part roll for the range ① is shaped in a caliper-shaped form fitting to 31.03 mm, the second for the range ② in a caliper-shaped form fitting to 43.33 mm, and the third for the range ③ in a caliper-shaped form fitting to 60.5 mm, respectively. Namely, each of them is shaped in a caliper-shaped form fitting to the maximum outside diameter of an applicable common range of use.

Figure 9:
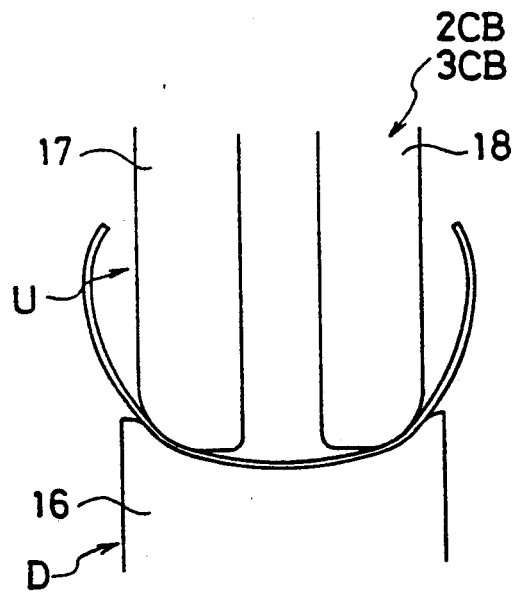
Figure 10:
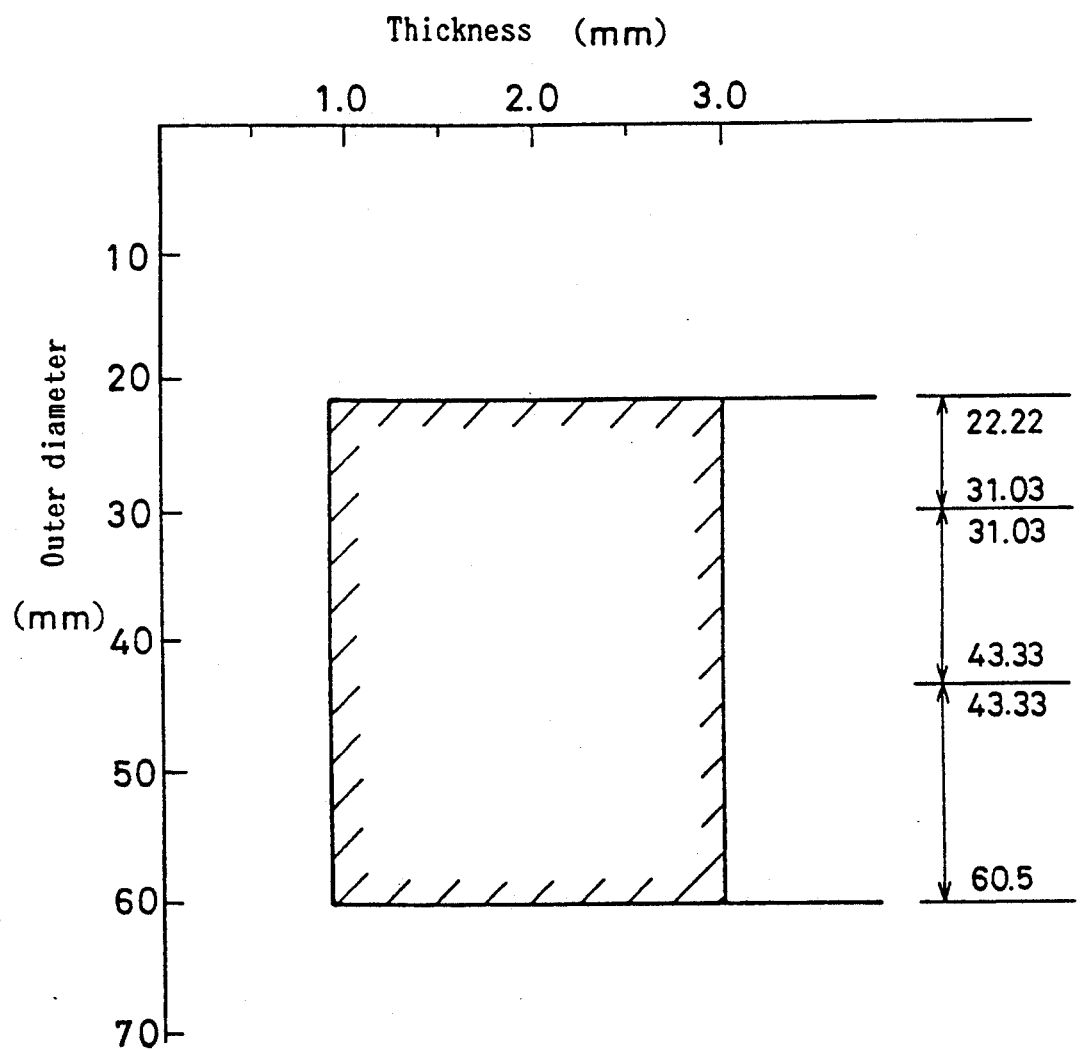
Figure 11:
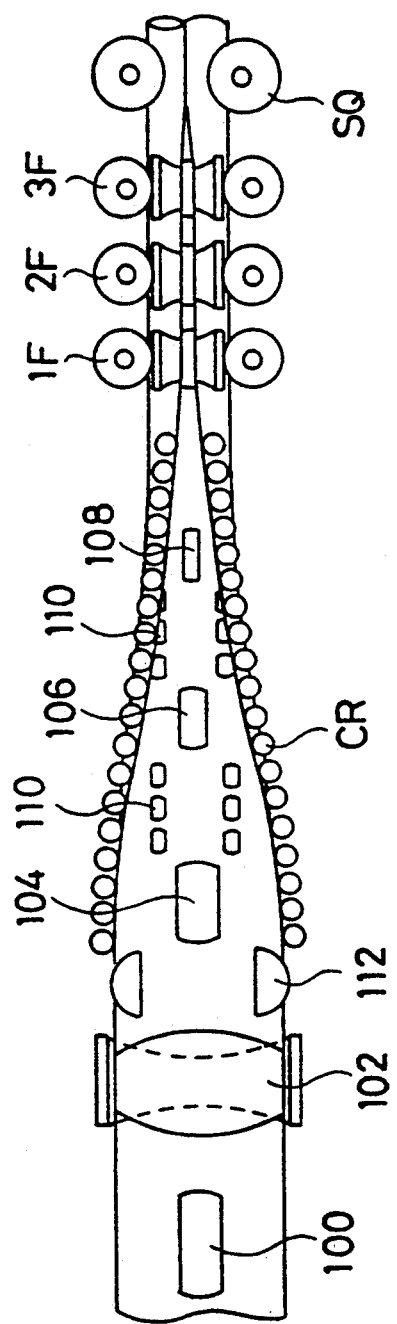
Figure 12:
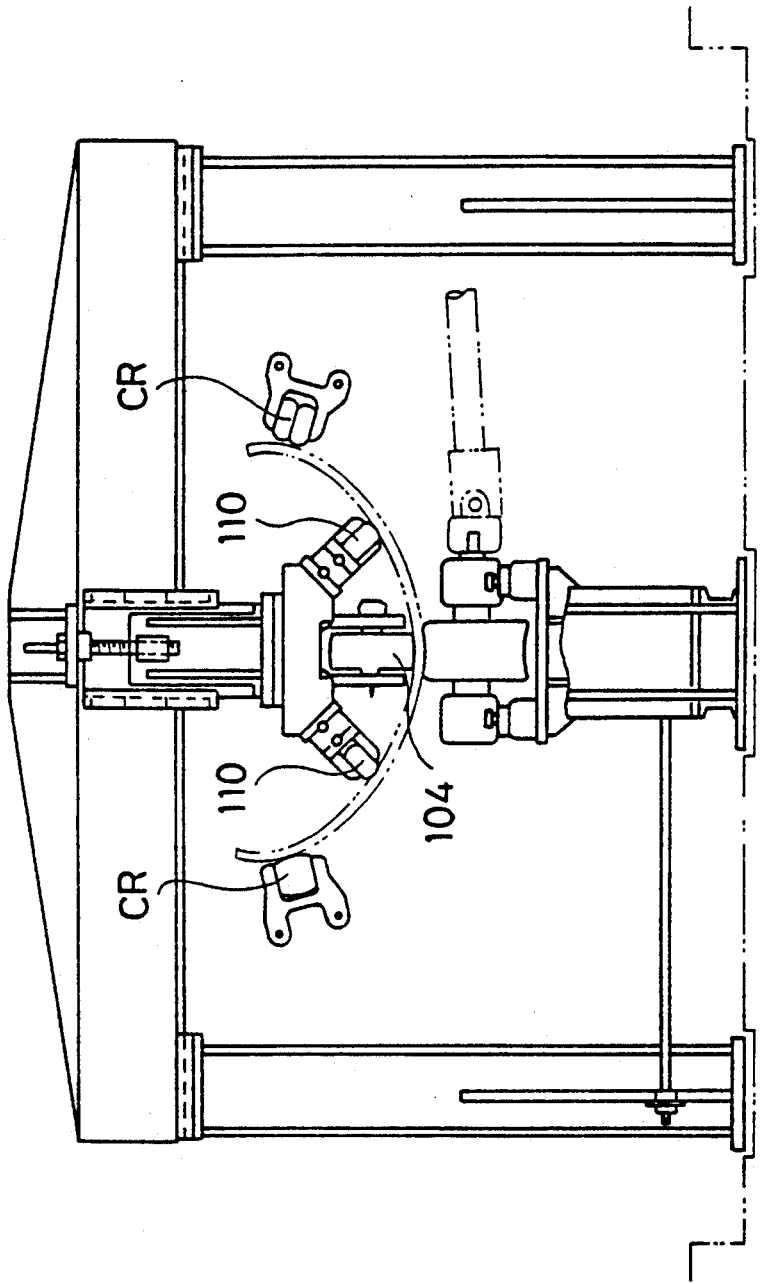
Figure 13:
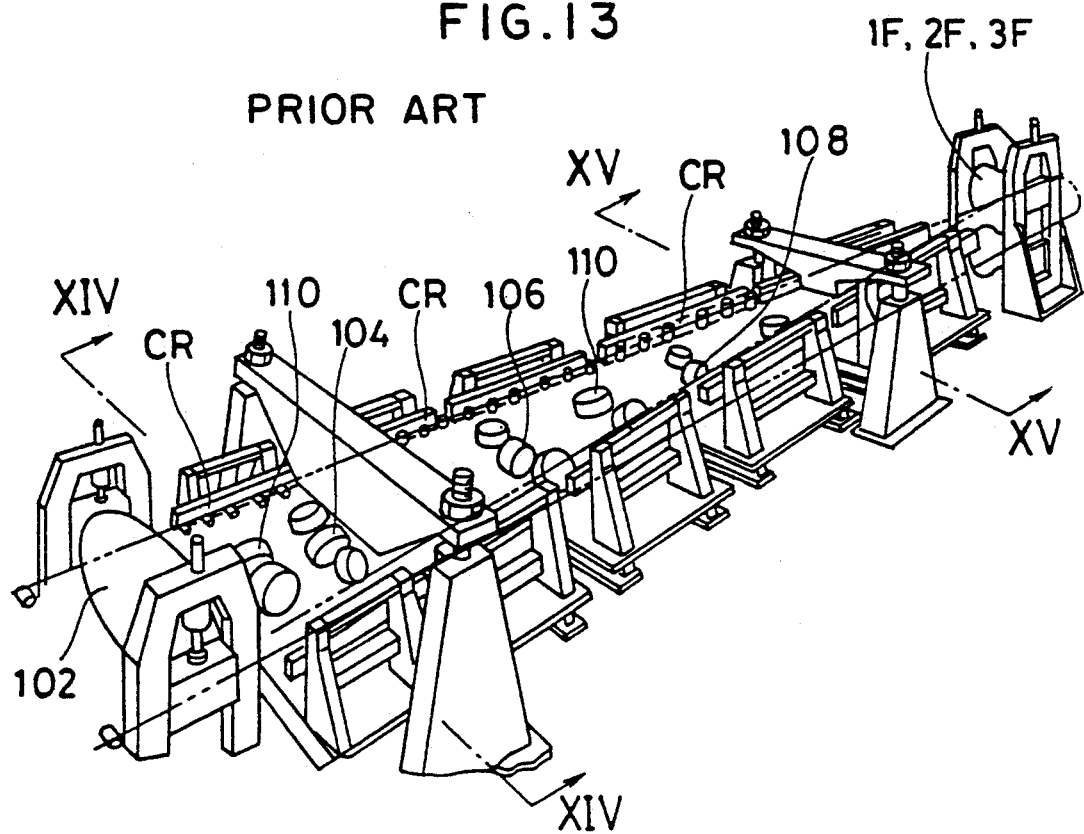
Figure 14:
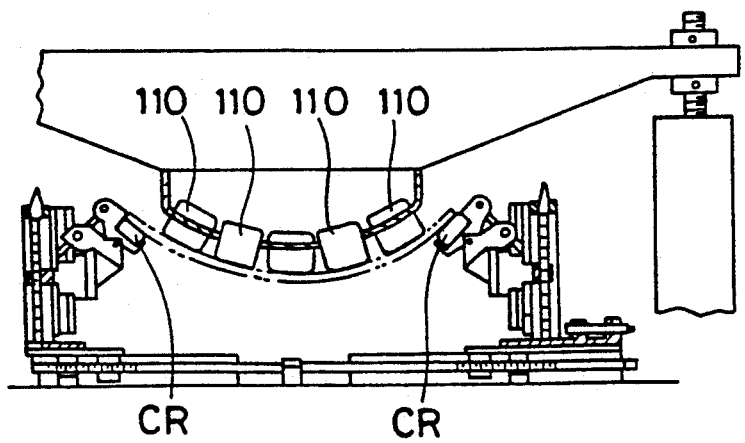
Figure 15:
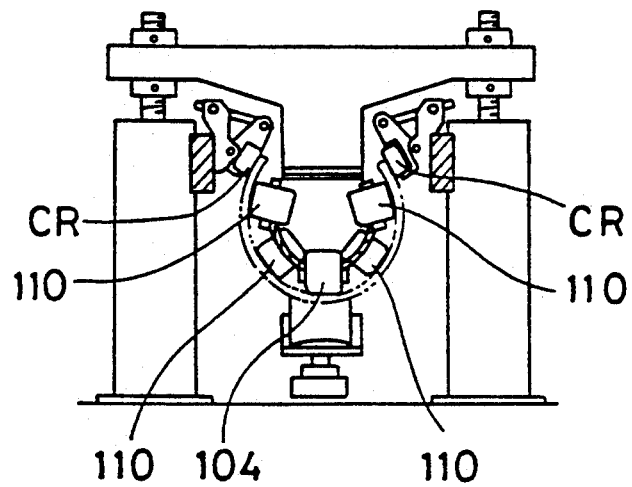
Figure 16:
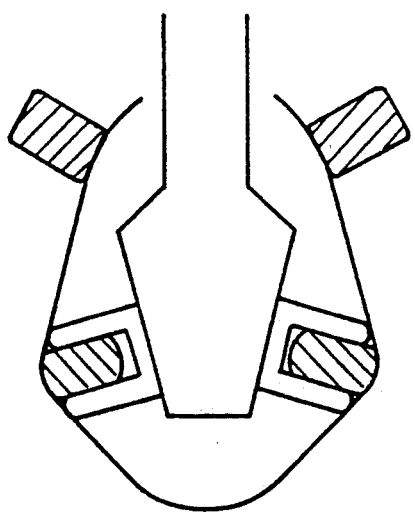
Figure 17:
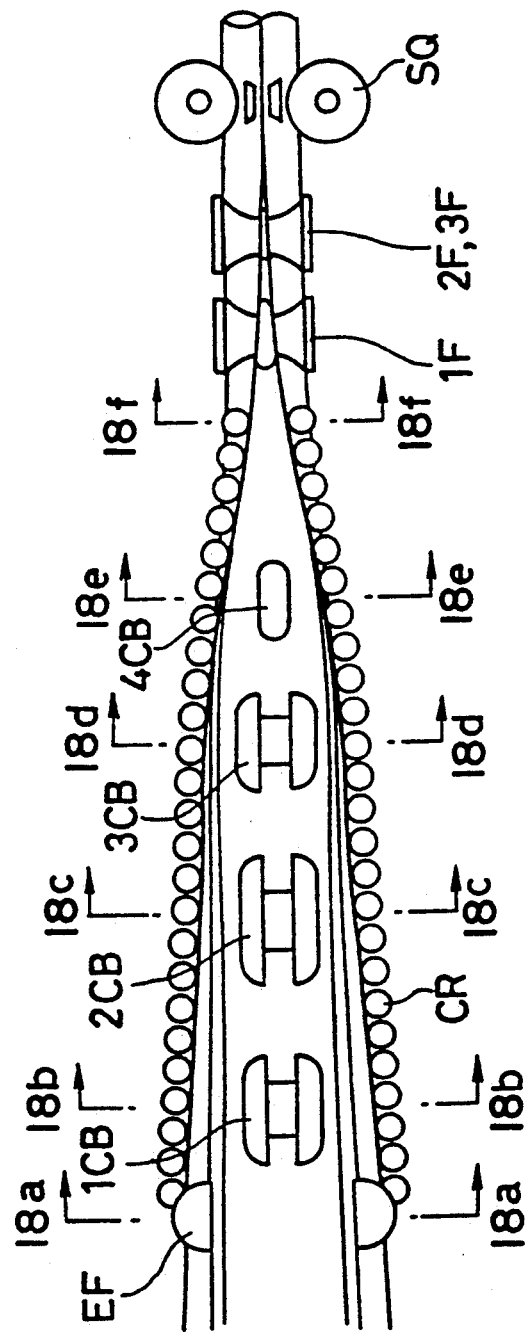
Figure 20:
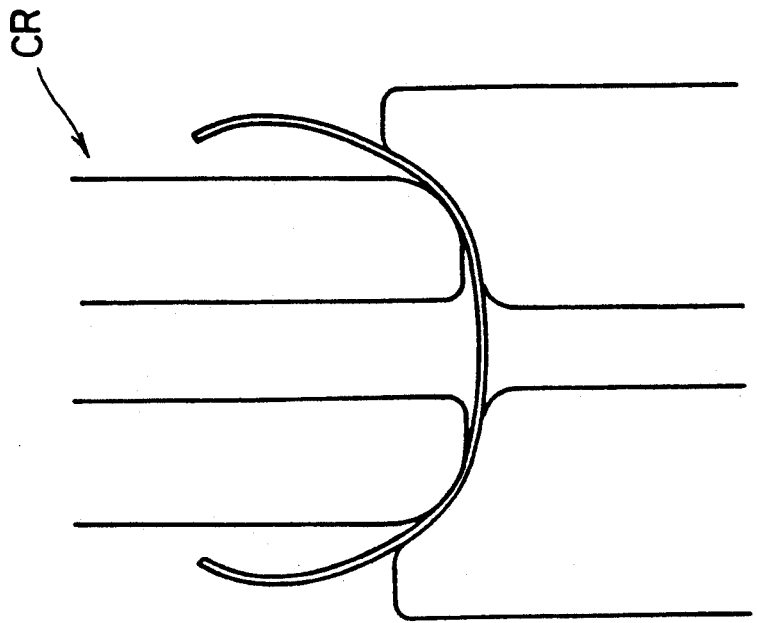
Figure 19:
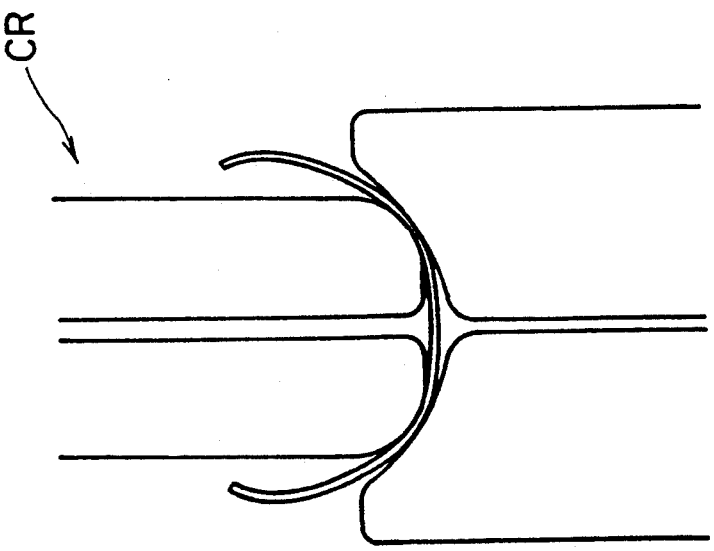

In the second and third center bending rolls 2CB and 3CB, as shown in FIG. 4 and FIG. 8 (FIG. 9), their upper rolls U, U each is made to be a split roll comprising two parts, right and left members 17 and 18, and adjustable in width in accordance with the size of a pipe to be produced (FIG. 8 shows a case of a smaller size of a pipe to be produced and FIG. 9 shows a case of a larger one). The upper roll U of the fourth center bending roll 4CB is made to be a one-part roll 28, as shown in FIG. 5.

And then, the second and third center bending rolls 2CB and 3CB serve to constrain under pressure the pipe side portions of the strip and the boundaries between the pipe side portions and pipe bottom portion and the fourth center bending roll 4CB serves to constrain under pressure the pipe bottom portion. These center bending rolls bend the same boundaries in excess of the bending extent for providing the finally formed circle and the pipe bottom portion in an extent equal to that for providing the finally formed circle, or in excess, together with the plurality of the cage rolls CR ..., CR ... arranged on both the sides thereof.

As to the cage rolls CR ..., as shown in FIG. 2 and FIG. 4 to FIG. 6, there are arranged the total of twelve rolls in four zones, three rolls in each zone, on both sides from the upstream position of the second center bending roll 2CB to the downstream position of the fourth center bending roll 4CB, and these cage rolls apply lateral pressure to the pipe from both sides, together with the second to fourth center bending rolls, whereby the strip from the boundaries between the pipe side portions and pipe bottom portion to the pipe bottom portion is bent in order, as mentioned above.

The first and second fin pass rolls 1F and 2F each comprises a finned upper roll and a finless bottom roll. The first fin pass roll 1F serves to form under pressure the pipe which has become oval-shaped in cross section at the previous step so that the boundaries between the pipe edge portions and pipe side portions and the boundaries between the pipe side portions and pipe bottom portion are further bent in excess and the pipe edge portions are bent in a proper degree, and then the second fin pass roll 2F serves to form under pressure the pipe successively so that the pipe side portions protrude outward and bent almost equally to the finally formed circle. At the same time, each of the said boundaries is unbent nearly to the finally formed circle.

The rotary seam guide roll RSG comprises a finned upper roll and a finless bottom roll, which rolls are adjustable in position and angle, and it serves to arrange the pipe in a normal welding attitude.

The high frequency welder HFW is one kind of resistance welder, whereby a welding current is caused to pass in the resulting seam of the pipe to heat and melt the same seam.

The squeezing roll SQ (FIG. 1) comprises a pair of right and left rolls which press the pipe from both sides so that the melted seam is upset-bonded and the thus-bonded pipe is corrected in shape into the form of a circle.

Figure 2:
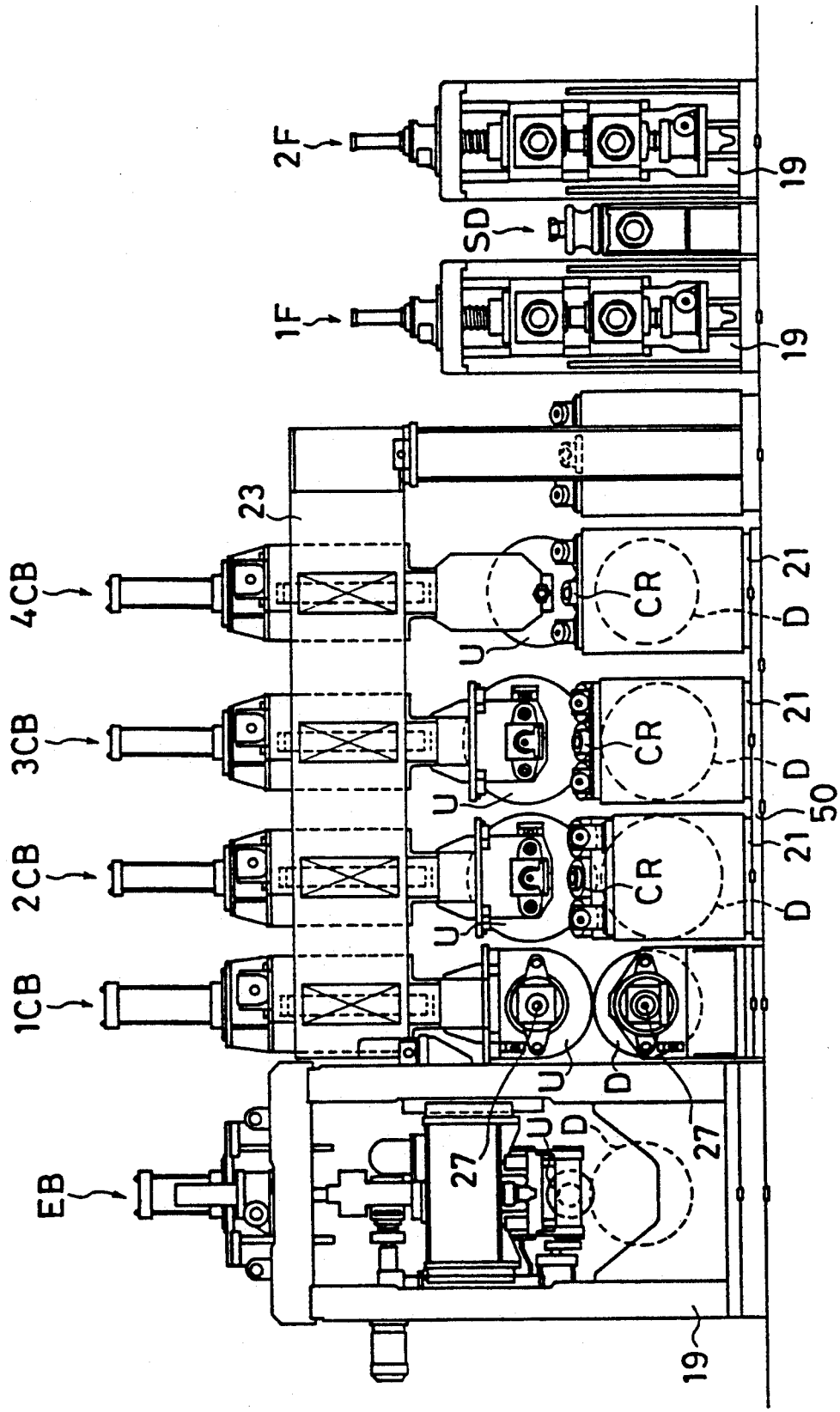
FIG. 2 to FIG. 10 show the embodiment of the present invention.

In the abovementioned edge bending roll EB, first and second fin pass rolls 1F and 2F, rotary seam guide roll RSG, by the way, as shown in FIG. 1 and FIG. 2, their upper and bottom rolls U ..., D ... are mounted, for exchange of the rolls, on an independent roll stand 19, and in the squeezing roll SQ, its right and left rolls are mounted, for exchange of the rolls, on a roll stand 20.

And, in the first to fourth center bending rolls 1CB, 2CB, 3CB and 4CB, as shown in FIG. 1 and FIG. 2, only their bottom roll D ... is mounted on an independent roll stand 21, and the second to fourth center bending roll stands 21 ... are fixed on one common sub-base plate 50, whereby the bottom rolls can be exchanged together with the common sub-base plate at a stroke. Their upper rolls U ... are also mounted, for exchange of the rolls, in one detachable housing 23 common to these four rolls. In the exchange of the upper and bottom rolls U ... and D ..., accordingly, four upper rolls or three bottom rolls can be exchanged at a stroke by exchanging the housing 23 or the common sub-base plate 50.

In each zone, as shown in FIG. 2 and FIG. 4 to FIG. 6, the three cage rolls CR ... are mounted in one roll stand 24 ..., and each roll stand has a slant advance and retreat control means 25 common to the three cage rolls. The control in this case may be carried out mainly on the intermediate roll. By virtue of the control means, the cage rolls can be applied to all the sizes of pipes to be produced. The angle of the cage rolls may be satisfactorily set previously in accordance with their positions.

The experiments relating to the abovementioned machine will be described next.
(1) Pipes manufactured for trial (See: FIG. 10):
  Outer Diameter: 22.22 mm~60.5 mm
(2) Strips used:
  Thickness: 0.8~3.0 mmm
  Materials:
    ① corresponding to ordinary steel SS41
    ② Stainless steel SUS 304

(3) The applicable range of use for the first to fourth center bending rolls 1CB, 2CB, 3CB, and 4CB (See: FIG. 10)
① Pipe outside diameter 22.22~31.03 mm
② Pipe outside diameter 31.03~43.33 mm
③ Pipe outside diameter 43.33~60.5 mm
(Three types of rolls ① to ③ were provided for.)

In this experiment, the desired purposes could be achieved with no trouble. For the change (adjustment) of the size of a pipe to be produced and for the exchange of the rolls in particular, it was confirmed that they could be carried out with the half of labor and time required in the prior art or less.

The present invention has the following effects.

(a) Since all the upper rolls of the first to fourth center bending rolls can be exchanged at a stroke, by setting these upper rolls in one housing, it is possible to reduce labor and time necessary for the exchange of these rolls in a large extent, thereby improving the rate of operation.

(b) Since all the bottom rolls of the second to fourth center bending rolls can be exchanged at a stroke, by setting these bottom roll stands on one common sub-base plate, it is possible to reduce labor and time necessary for the exchange of these rolls in a large extent, thereby improving the rate of operation.

(c) Since the strip is bent in order, from its pipe edge portions to the boundaries between the pipe edge portions and its pipe side portions by the edge bending roll, on the pipe side portions by the first center bending roll, from the boundaries between the pipe side portions and pipe bottom portion to the pipe side portions by the second to fourth center bending rolls and a number of the cage rolls arranged on both the sides thereof, it is possible to shape the pipe in an oval-shaped form in cross section, before it reaches the fin pass rolls, and since the oval-shaped pipe is formed under pressure so that the pipe side portions are protruded sideway, it is possible to carry out the bending work of the strip precisely, while it does not assume a polygonal form. Furthermore, two stages of fin pass rolls will be sufficient, because the load in the fin pass roll forming course is smaller, and as a result, it is possible to reduce the number of rolls in whole and to compact the whole of the machine.

(d) Since the strip is constrained from the pipe edge portions to the boundaries between the pipe edge portions and pipe side portions by the edge bending roll, on the pipe side portions by the first center bending roll, from the boundaries between the pipe side portions and the pipe bottom portion to the pipe bottom portion by the second to fourth center bending rolls, and from the pipe edge portions to the pipe side portions by the cage rolls, and namely the strip is sufficiently constrained almost in the whole area in the breadth direction, it is possible to stabilize the roll forming work and to improve the quality of product pipes, while the strip is prevented from getting out of the center and rolling with no formation of edge waves.

(e) Since a driving means is provided on the edge bending roll for constraining the pipe edge portions and the boundaries adjacent thereto, the first center bending roll for constraining the pipe side portions, and the first and second fin pass rolls for constraining the top and bottom portions of the pipe, respectively, the strip is given the transmission of torque in a wide range in the breadth direction. It is, therefore, possible to make the strip to progress smoothly. Since the upper rolls of the second to fourth center bending rolls are not driven, it is possible to make the machine small-scaled and to ensure the space where the cage rolls are installed, without any trouble, leading to the decrease of their installing expense.

(f) Since the bottom rolls of the second to fourth center bending rolls each is made to be a caliper-shaped one-part roll fitting to the maximum pipe size of an applicable common range of use, it is possible to eliminate the formation of dents or roll flaws on the strip by the roll corners. If the size of a steel pipe is in a predetermined range, it is not necessary to adjust the roll space, even when the size of a pipe to be produced is changed, and there is no need of labor and time for the roll adjustment.

(g) Since the cage rolls are mounted so as to be controllable for slant advance and retreat, they are applicable to all the sizes of pipes to be produced and the control of the cage rolls can be carried out only by one element. Namely, it is possible to control the cage rolls easily and quickly, and to simplify the structure of the machine.

Next, the modification examples shown in FIG. 22 to FIG. 27 will be described.

In FIG. 22 to FIG. 27, first to fourth center bending rolls 1CB, 2CB, 3CB and 4CB each comprises an upper roll U . . . and a bottom roll D . . . which stand opposite to each other, wherein each bottom roll D . . . and each upper roll U . . . are mounted on a common stand frame 202 for the bottom rolls, arranged on a base plate 201, and a common stand frame 203 for the upper rolls, respectively. In addition, the upper roll U and bottom roll D of the first center bending roll 1CB each is made to be a driving roll connected to a driving means and all the other rolls each is made to be a non-driven roll.

The bottom roll common stand frame 202 is composed so that four pairs of chocks 222, 223, . . . , each pair consisting of a right chock and a left chock, are arranged in order on both the sides of a groove-shaped frame 221 which is long in the line direction, and the bottom rolls D . . . of the first to fourth center bending rolls 1CB, 2CB, 3CB and 4CB are journaled in these chocks. But, the portion of the frame 221 for the first center bending roll 1CB is made broaded in width so as to be suitable for driving, because its bottom roll D is of a driving roll.

Under the chocks 223, in which the bottom roll D . . . of the second to fourth center bending rolls 2CB, 3CB and 4CB are journaled, there are arranged oil-hydraulic jacks 224, whereby the chocks 223 . . . and the down rolls D . . . are made adjustable in height, and further all the down rolls D . . . of the first to fourth center bending rolls 1CB, 2CB, 3CB and 4CB are made adjustable in height by their shim adjustment.

The bottom roll common stand frame 202 is arranged detachably on a base plate 201, and positioned at a predetermined position by a positioning means 204 and a clamping means 205.

The positioning means 204 is composed so that on both the sides of the down roll common stand frame 202, two pairs of breadth fittings 241, 242, are arranged against the front and rear and a butt fitting 243 is arranged against the rear end, each of these fittings being fixed on the base plate 201, and an oil-hydraulic cylinder 244 for pressing backward the bottom roll common stand frame 202 is arranged against the front and fixed on the base plate. Thus, the bottom roll common stand frame 202 will be positioned by inserting the same stand frame 202 between the breadth fittings 241, 241, 242, 242 and actuating the oil-hydraulic cylinder 244 to press the same stand frame 202 against the butt fitting 243.

The clamping means 205 is composed so that a semicircular engaging projection 251 . . . is arranged respectively at the front and rear on both the sides of the bottom roll common stand frame 202, and an oil-hydraulic clamp 252 . . . is arranged against each of these engaging projections 251 . . . and mounted on the base plate 201. Thus, these oil-hydraulic clamps 252 . . . will be engaged with each of the engaging projections 251 by oil pressure.

In addition, the reference numeral 206 represents a suspension ring provided at the front and rear of the bottom roll common stand frame 202 respectively.

The upper roll common stand frame 203 is composed so that cylindrical legs 231, 232 are arranged at the front and rear and fixed on the base plate 201, and a horizontal frame 233 is detachably mounted on the said legs, and the upper rolls U . . . of the first to fourth center bending rolls 1CB, 2CB, 3CB and 4CB are mounted movably up and down on the said horizontal frame.

The upper rolls U . . . each is journaled on a lifting frame 235 which is lifted by a worm jack 234 . . . , and these lifting frames are engaged liftably and slidably on a pair of vertical sliding guides 236, 236 . . . , arranged on the horizontal frame 233.

Two worm jacks 234 . . . are arranged for the upper roll U of the first center bending roll and one worm jack 234 for the upper rolls U . . . of the other center bending rolls, respectively on the horizontal frame 233, because the upper roll U of the first center bending roll 1CB is a driving roll and the lifting frame 235 is given large load. These worm jacks 234 . . . will be driven by reversible reduction motors 237 . . . .

On the horizontal frame 233, there are arranged one oil-hydraulic cylinder 238 for the lifting frame 235 of the first center bending roll 1CB, and two air cylinders 239 . . . for each of the other lifting frames 235, respectively, wherein upward force is applied to the lifting frames, thereby eliminating a play of the worm jacks 234.

A positioning means 207 and a clamping means 208 are further installed between the legs 231, 232 and the horizontal frame 233.

The positioning means 207 is composed so that butt fittings 271 . . . are provided at the right end of the top surfaces of both the front and rear legs 231, 232 and at the right and left rear of the top surfaces of the rear legs 232, and oil-hydraulic cylinders 272, 272 for pressing the horizontal frame 233 right are provided at the left end of the top surfaces of both the front and rear legs 231, 232, and oil-hydraulic cylinders 273, for pressing the horizontal frame 232 backward at the right and left front ends of the top surfaces of the rear legs 232, respectively. Thus, the horizontal frame 233 will be set at a predetermined position by pressing the same frame 233 into contact with the butt fittings 271 . . . by these oil-hydraulic cylinders.

The clamping means 208 comprises fastening bolts 281 . . . , each directed backward, which are mounted at the right and left front end of the top surfaces of both the front and rear legs 231, whereby the horizontal frame 233 set at the predetermined position can be fastened and fixed.

Due to the above mentioned constitution, the following procedure may be preferably taken for the exchange of rolls in the first to fourth center bending rolls 1CB, 2CB, 3CB and 4CB.

I. In the upper roll common stand frame 203, all the fastening bolts 281 . . . which constitute the clamping means 208, are loosened, all the oil-hydraulic cylinder 272, 273, of the positioning means 207 are retreated, and the horizontal frame 233 is removed together with all the upper rolls U . . . by a crane.

II. In the bottom roll common stand frame 202, all the oil-hydraulic clamps 252 . . . of the clamping means 205 are retreated for disengagement, the oil-hydraulic cylinder 244 of the positioning means 204 is retreated, and the bottom roll common stand frame 202 is removed together with all the bottom rolls D . . . by a crane.

III. A bottom roll common stand frame 202 in which new bottom rolls D . . . are mounted is incorporated by a crane so as to be inserted between the breadth fittings 241, 241, 242, 242 of the positioning means 204, and pressed against the butt fitting 243 by elongating the oil-hydraulic cylinder 244, and then it is engaged with the engaging projections 251 . . . by advancing all the oil-hydraulic clamps 252 . . . , which constitute the clamping means 205. At that time, each of the bottom rolls D . . . is adjusted in height by the shim adjustment and the control of the oil-hydraulic jacks 223, 223 . . .

IV. The horizontal frame 233 of an upper roll common stand frame 203, in which new upper rolls U . . . are mounted, is incorporated by a crane so as to be placed on the legs 231, 232. All the oil-hydraulic cylinders 272, 273, of the positioning means 207 are advanced to press the horizontal frame 233 into contact with all the butt fittings 271 . . . , and then all the fastening bolts 281 . . . of the clamping means 208 are fastened to fix the horizontal frame 233 at a predetermined position. Furthermore, each of the worm jacks 234 . . . is actuated by the reversible reduction motors 237 . . . to adjust the height of each lifting frame 235 . . . and each upper roll U . . . , and at the same time, the oil-hydraulic cylinder 238 and air cylinders 239 . . . are actuated to eliminate the play thereof.

Experiments were carried out and the following results were obtained.

(1) Size of a pipe to be produced, changed: the outside diameter of pipe 60.5 mm→31.8 mm
(2) Forming rolls subjected to the roll exchange: the first to fourth center bending rolls
(3) Experimental results (compared with the prior art):
  ① Exchanging time of the stand:
    Prior art: including the adjusting time: 15(min/-set)×4 (set)=60 (min)
    Present invention: Adjustment can be pre-set in off-line
    Upper roll: 5 (min)
    Down roll: 5 (min) Total: 10 (min)
  ② Fitting accuracy:
    Prior art: Accuracy in the center inserting direction less than ±0.2 (min)
    Present invention:
    Accuracy in the center inserting direction less than ±0.05 (min)

According to the present invention, it is possible to exchange several stages of forming rolls at a stroke by the exchange of the common stand frame in either case of the upper or bottom rolls, and to decrease the labor and time required for the roll exchange remarkably so that the suspension time of the line can be shortened sharply, leading to the reduction of cost.

Furthermore, it is possible to improve the fitting accuracy and to carry out the adjustment easily and precisely so that the quality of products can be improved.

Figure 6:
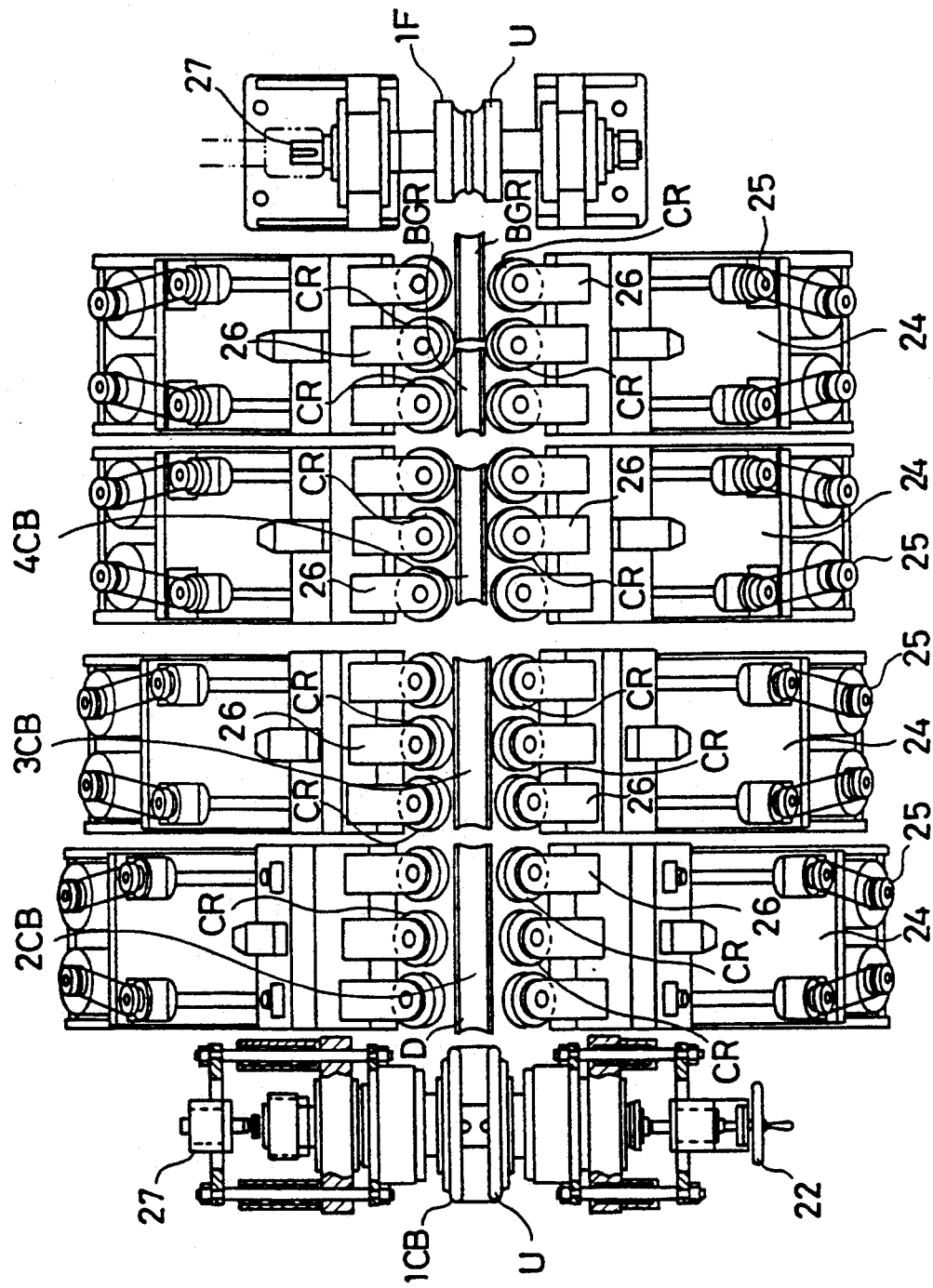
Figure 21:
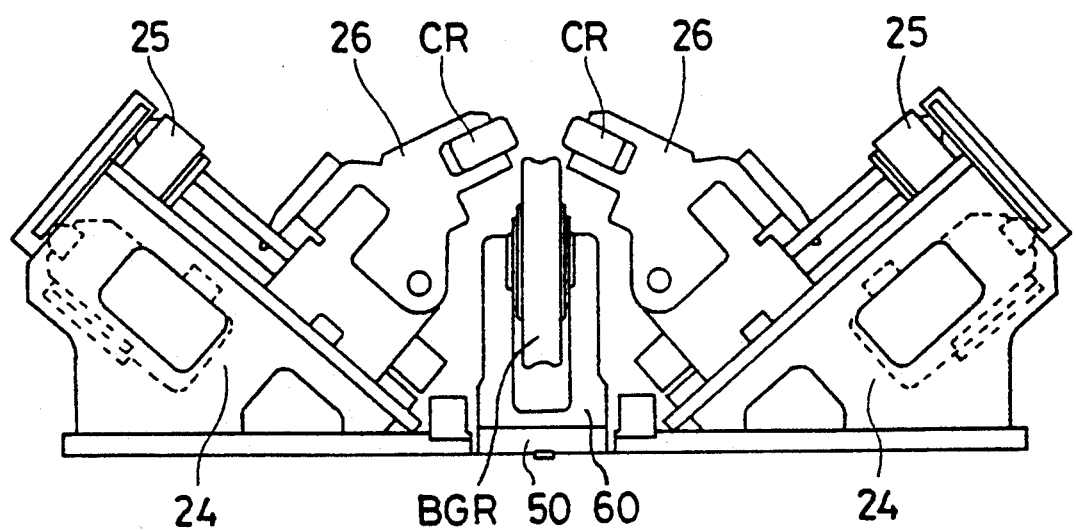
FIG. 21 is a front view of the bottom guide roll.
Figure 22:
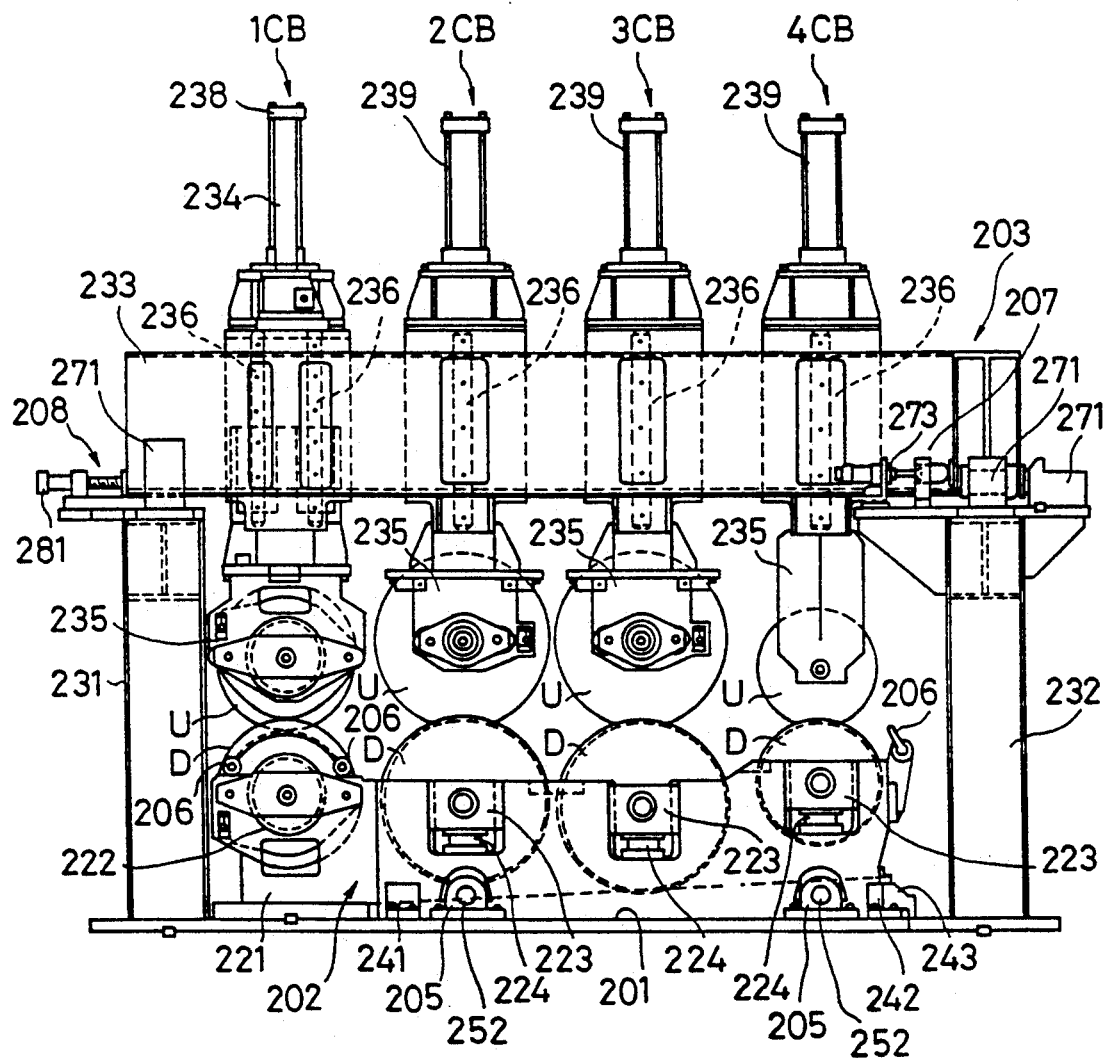
FIG. 22 is a side view.
Figure 23:
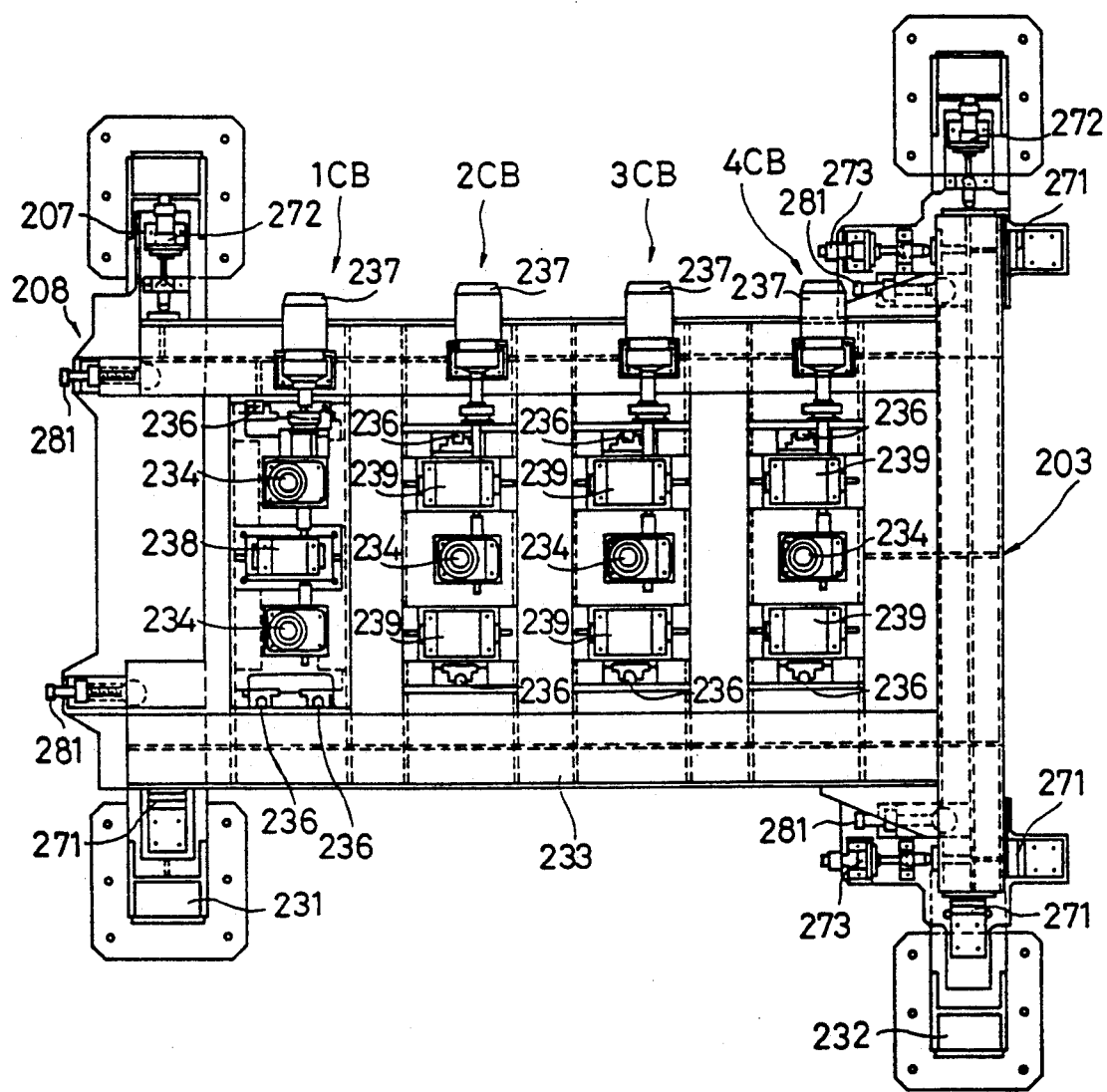
FIG. 23 is a plan view.
Figure 24:
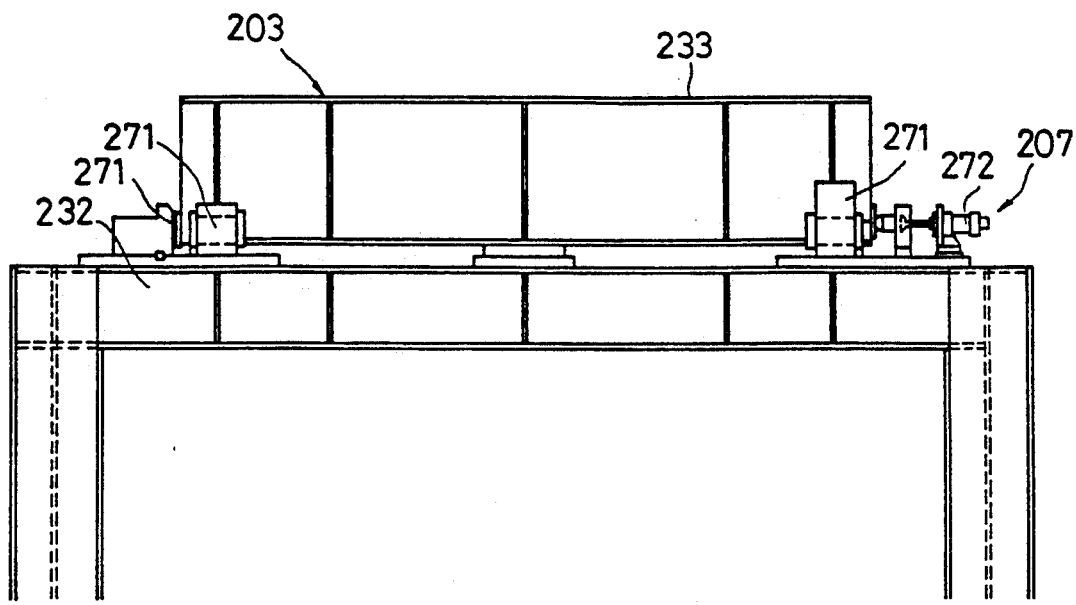
FIG. 24 is a rear elevational view of the main part.
Figure 25:
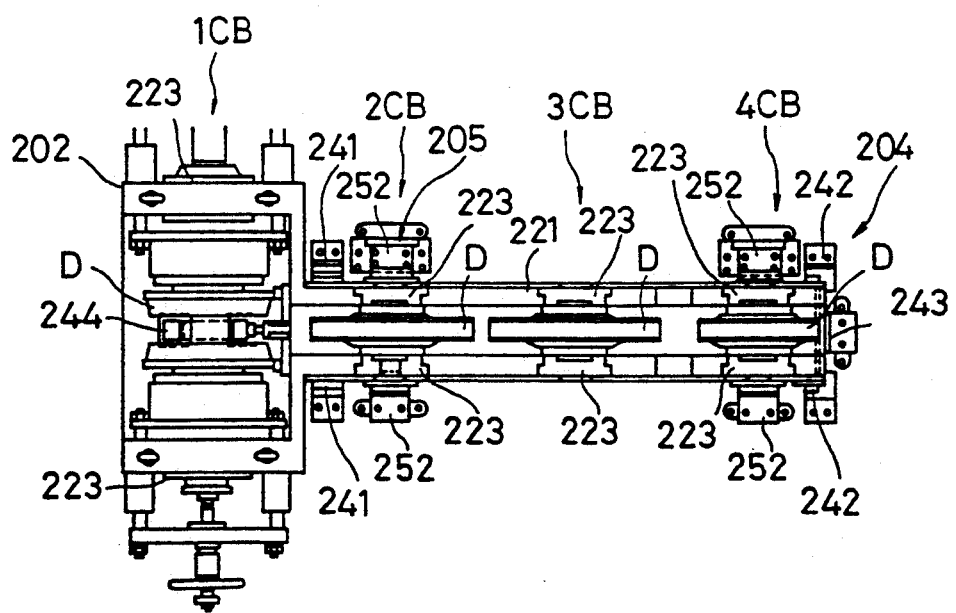
FIG. 25 is a plan view of the main part.
Figure 26:
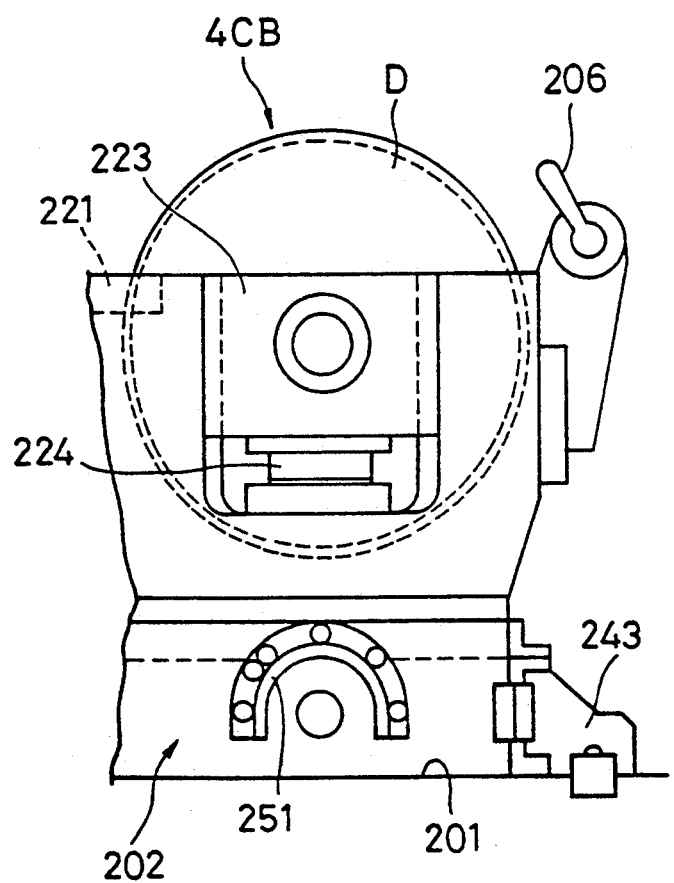
FIG. 26 is an enlarged side view of the main part.
Figure 27:
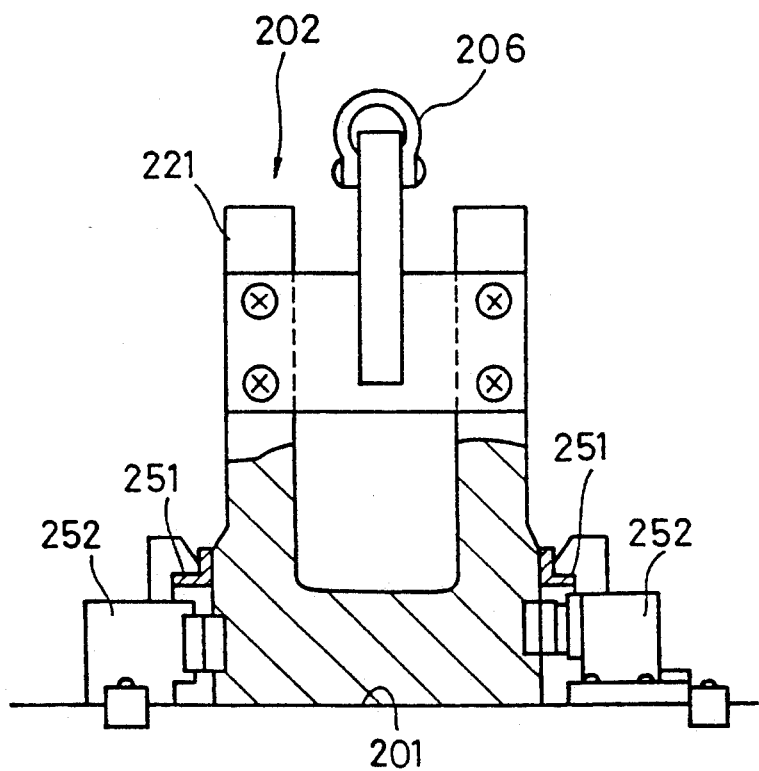
FIG. 27 is an enlarged cutaway rear elevational view of the same main part.

Then, the bottom guide roll arranged in the last zone of a cage roll forming zone, as shown in FIG. 6 and FIG. 21, will be described.

Namely, a bottom guide roll stand 60 is arranged midway between the right and left cage roll stands 24, placed on a base plate.

In the right and left cage roll stands 24, 24, three cage rolls CR . . . are arranged above each of stand bodies placed on the base plate.

The bottom guide roll stand 60 is made up by stand body between the stand bodies of the said right and left cage roll stands 24, and further arranging, above the base plate, two bottom guide rolls BGR . . . in order along the line (See: FIG. 6) and journaling each of these bottom guide rolls on a pair of bearings placed on the base plate.

(B) Edge bending roll

The constitution of the edge bending roll EB will be described.

Figure 28:
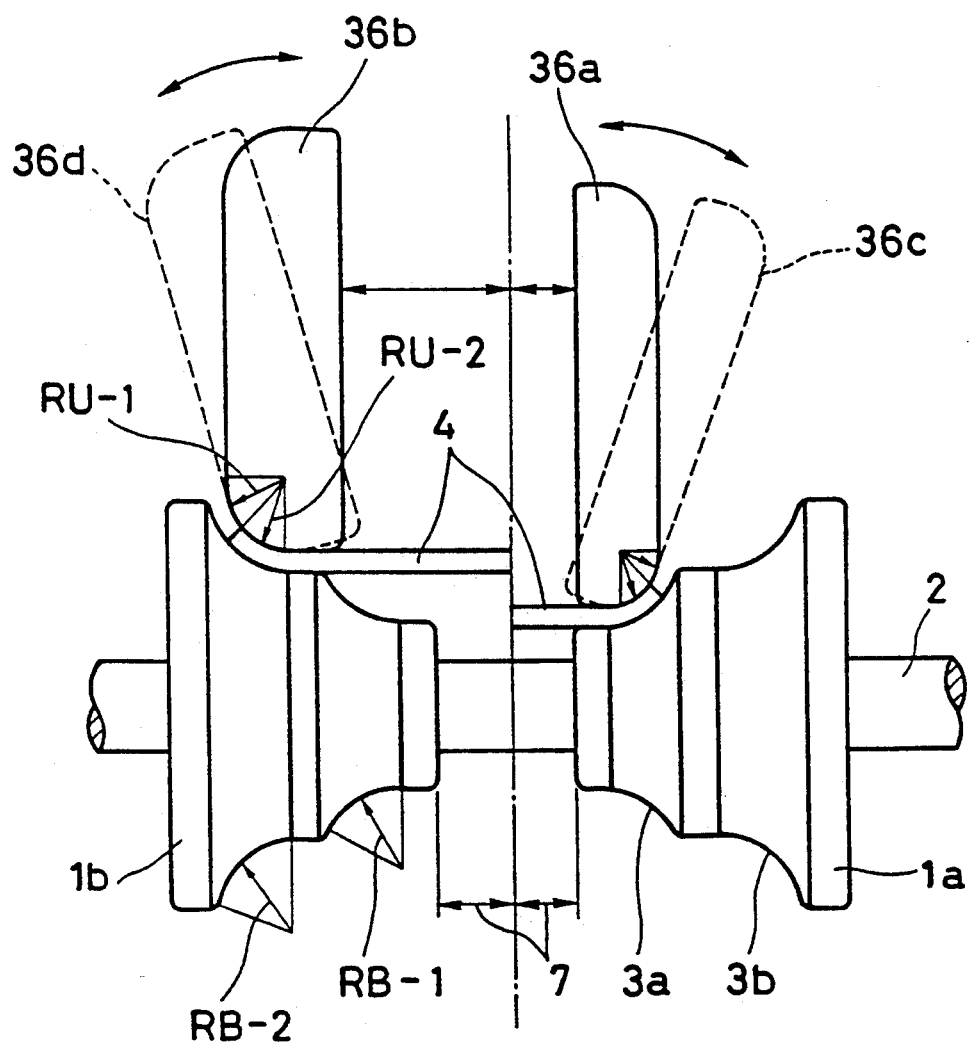
FIG. 28 is an illustrative view of the forming method for different forming sizes, in which the strip edge forming roll according to the present invention is used, taken from the front.

At first, FIG. 28 to FIG. 30 will be described. Bottom rolls 1a, 1b, split right and left, are put on the outer periphery of a shaft 2 so that the space 7 between both these bottom rolls is adjustable. The right and left split bottom rolls 1a, 1b each is made to be a stepped rolls having two large and small steps in which the inner face side has a small outer diameter and the outer face side has a large outer diameter, wherein on these respective steps different in outer diameter, concavely curved peripheral surfaces 3a, 3b having radii of curvature RB-1 and RB-2 different from each other are provided on the portions thereof opposite to the edge of a strip, respectively. In the illustrated example, RB-1 is for the size of a small-diametered pipe to be produced and RB-2 is for the size of a large-diametered one.

The forming of a strip 4 will be carried out at a predetermined pass line height. Since the respective steps of the said bottom roll are different in outside diameter, the shaft 2 is provided so that its height is adjustable, in order that the roll surface at each step can be accorded to its pass line height. When the bottom roll is driven, a transmission gear must be attached in order that the speed of the roll surface can be kept constant in spite of the difference in outside diameter of the respective steps.

The upper roll is also made to be upper rolls 36a, 36b, split right and left, in which each roll is journaled by a roll holder 16a, 16b (See: FIG. 31). The roll holders are also adjustable in space between them. In such a manner as shown in FIG. 28, wherein the upper roll 36a is inclined in the position 36c shown by a dotted line and the upper roll 36b in the position 36d shown by a dotted line, respectively, the upper roll is made to be capable of being inclined in the breadth direction of the strip 4 by way of the upper roll holder, whereby the operation face of the roll surface of the upper roll can be changed, and namely the upper roll can be set inclinedly, as shown in FIG. 30.

Figure 29:
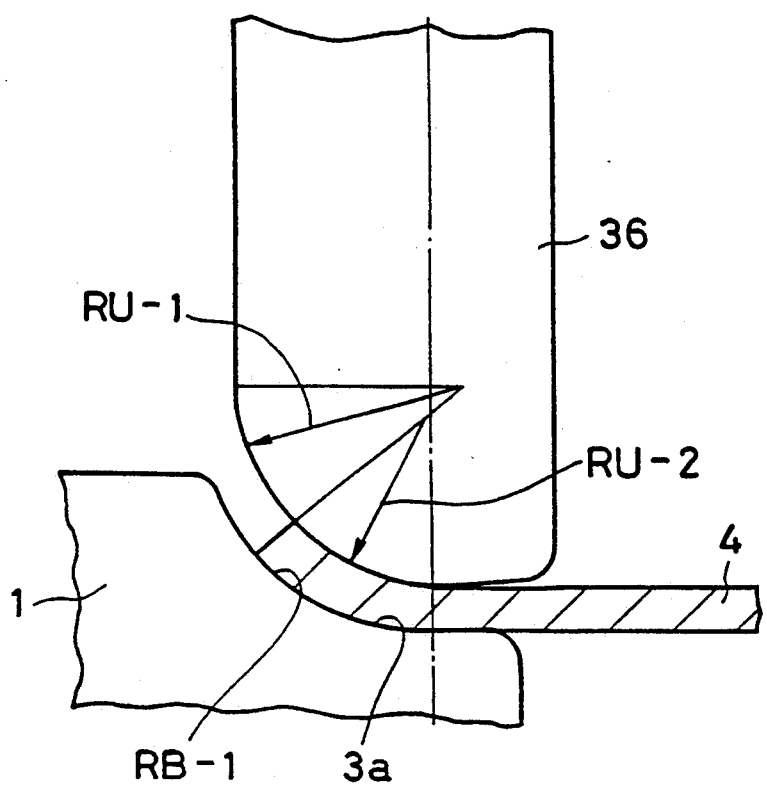
FIG. 29 is an illustrative view showing the setting situation of the upper amd bottom rolls in the forming of a thick strip.
Figure 30:
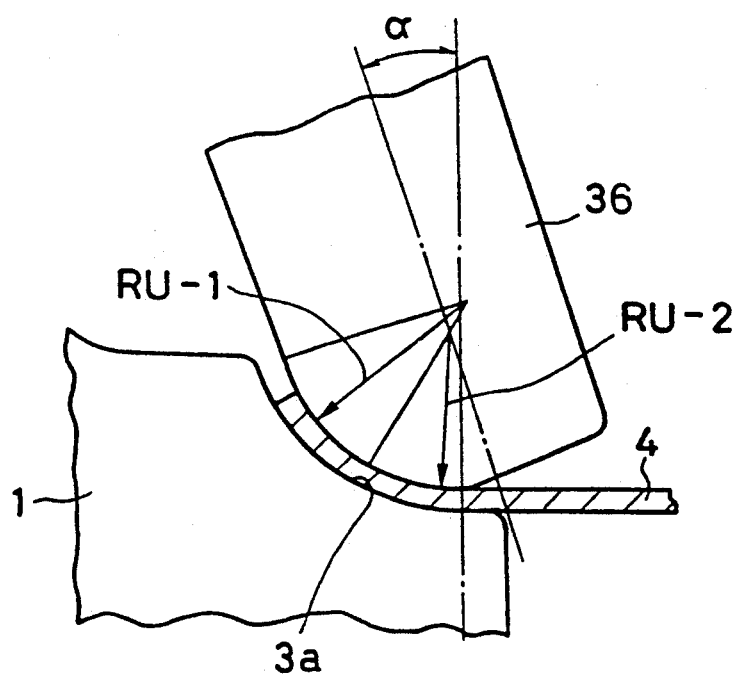
FIG. 30 is an illustrative view showing the setting situation of the upper roll inclined in the forming of a thin strip.
Figure 31:
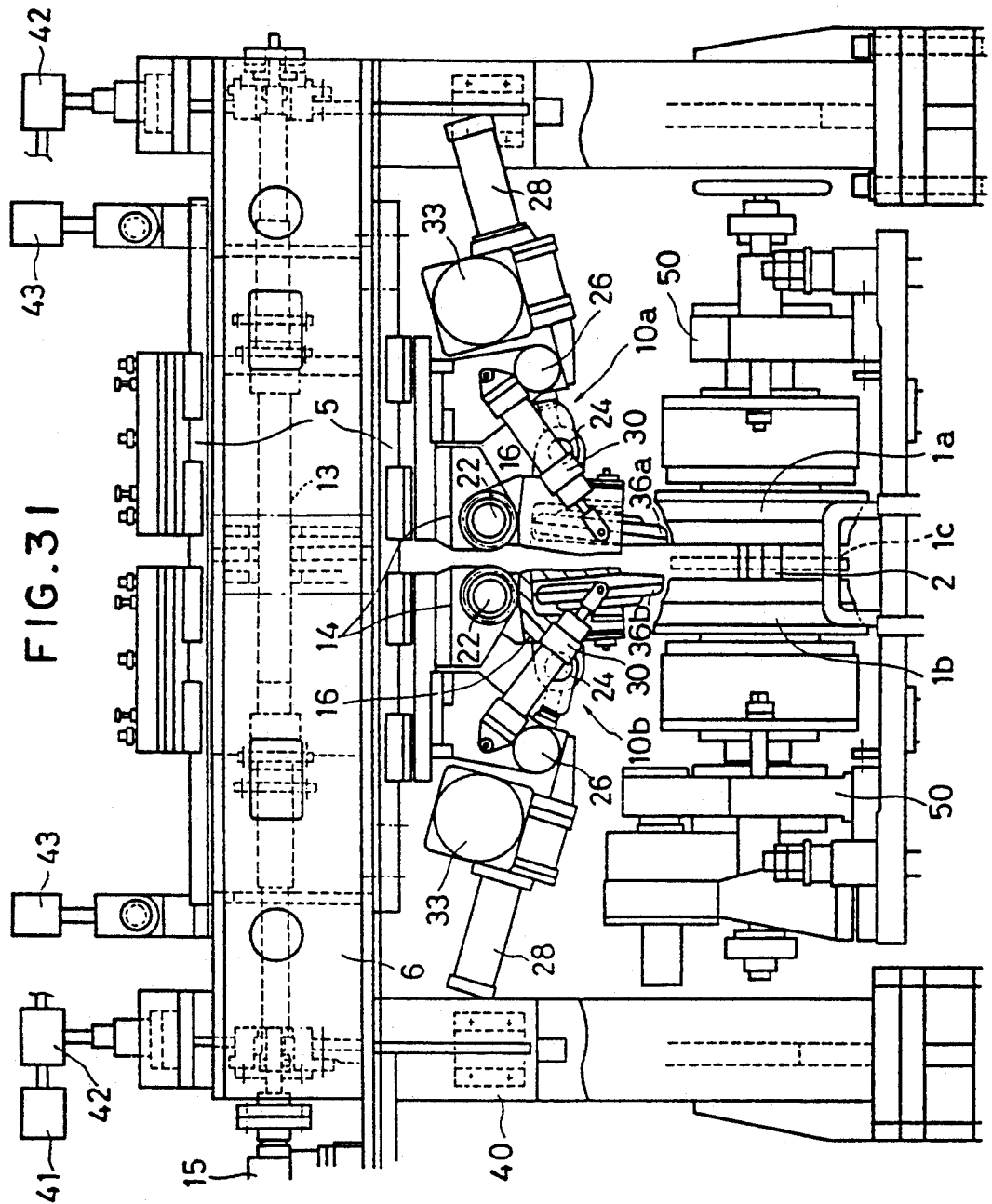
FIG. 31 is a front view of the machine, in which one embodiment of the present invention is shown.

In the convexly curved face portion of the upper roll, its cross-sectional profile is shaped in such a form that two sectors having a radius of curvature RU-1 used for the forming of a thin strip (small in thickness) and a radius of curvature RU-2 used for the forming of a thick strip (large in thickness) are made adjacent as shown in FIG. 29 and FIG. 30. The roll surface portion with the radius of curvature RU-1 may be preferably applied for strips of the minimum thickness to the middle thickness, and the roll surface portion with the radius of curvature RU-2 for strips of the middle thickness to the maximum thickness, respectively.

When a thick strip is formed, the roll surface portion with the radius of curvature RU-1 will be used by inclining the upper roll 36 by an inclining mechanism, as shown in FIG. 30.

In addition, the center of inclination of the upper roll 36 will be set on the normal line erected at the end of the convexly curved face of the upper roll 36 (for instance, on the dotted line of FIG. 29). This can facilitate the setting of the upper roll 36 and decrease the change in the gap between the upper and bottom rolls, even when the upper roll 36 is inclined.

When a thick strip is formed, the roll surface portion with the radius of curvature RU-2 will be used by erecting the upper roll 36 vertically, as shown in FIG. 29. In the case of a strip with a middle thickness, the upper roll 36 may be used by setting the angle of inclination $\alpha$ thereof at a proper value within a range which can be set. The upper roll shall be of such a system that the upper roll is drawn out for exchange from the roll holder when each of the RB-1 face portion for the size of small outside diameter and the RB-2 face portion for the size of large outside diameter of the stepped bottom roll is used. As to the upper roll, in conclusion, there will be provided two rolls, one for the small size of outside diameter, covering the minimum outside diameter to the middle outside diameter, and another for the large size of outside diameter, covering the middle outside diameter to the maximum outside diameter.

Providing that steel pipes 22.22 mm~60.5 mm in outside diameter are manufactured, for instance, the applicable ranges of use for the upper and bottom rolls in the edge bending roll EB will be divided to three ranges, ①22.22 mm~31.03 mm, ② 31.03 mm~43.33 mm and ③ 43.33 mm~60.5 mm, and in each of the upper roll and bottom roll, three sets of roll groups ①, ② and ③ will be provided for. At that time, the bottom roll for ① has RB-1 of 22.22 mm~26.63 mm and RB-2 of 26.64 mm~31.03 mm, the down roll for ② has RB-1 of 31.04 mm~37.18 mm and RB-2 of 37.19 mm~43.33 mm, and the bottom roll for ③ has RB-1 of 43.34 mm~51.92 mm and RB-2 of 51.93 mm~60.5 mm.

It is a matter of course to provide a space-adjusting function between the abovementioned bottom roll and upper rolls.

For instance, the bottom rolls 1a, 1b and upper rolls 36a, 36b will be incorporated in such a machine as shown in FIG. 31. Both the ends of the bottom roll shaft 2 are supported in bottom roll journaling portions 50.

In the housing 40, a beam 6 is supported as a lift frame which is lifted by a worm jack 42 driven by a press motor 41, and beam 6 is being pressed by an air cylinder 43 in the same direction as the direction of the forming reaction force.

Above the bottom rolls 1a, 1b, slide rails 5 are installed up and down in a direction meeting at right angles with the progressing direction of the strip 4. These slide rails are fixed on beam 6 as a lifting frame which is supported at both its right and left ends by a housing 40. The beam 6 is movable up and down with respect to the housing 40 so that a clearance for holding the strip between the bottom rolls and the upper rolls, hereinafter mentioned, can be adjusted.

A pair of right and left main apparatus bodies 10a and 10b are mounted on the slide rails 5. These main apparatus bodies 10a, 10b are mounted for sliding movement on the side rails 5, and upper roll supporting frames 14 are hung at a given interval from the middle portion of the beam 6 in the longitudinal direction between the side rails and the beams. Both the right and left ends of the upper roll supporting frame 14 have a threaded portion, and a shaft 13 having a screw-threaded portion engaged with the threaded portion of the upper roll supporting frame 14 is journaled by the fixing plate portions provided at both the right and left ends between both the beams.

The shaft 13 is connected to a reversible motor 15 fixed on the fixing plate portion so that the movement of the upper roll in the breadth direction is made possible.

The upper roll supporting frame has shafts 22, 26 provided in parallel to the progressing direction of the strip and the upper roll holder 16 also has a simillar shaft 24 provided thereon, and a worm jack 28 for giving a turning function for the upper roll, and an AC reversible motor 33 for driving the same worm jack are mounted on the said shaft 26. The rectilinear motion of the worm jack 28 will be changed to the turning motion for the upper roll holder 16 and upper roll 36 by use of the said three shafts 22, 24 and 26 as fulcrums.

An air cylinder 30 is provided between the upper roll holder 16 and upper roll supporting frame 14, so that backlash existing in the upper roll and upper roll holder can be eliminated.

In addition, it is effective to support the strip 4 by a semi-split type of roll 1c arranged at the center of the bottom roll, in particular when the strip width is larger. This center roll 1c will be exchanged in accordance with the used step of the bottom roll.

Namely, the upper roll supporting apparatus of the edge bending roll EB shown in FIG. 31 comprises having the beam 6 as a lifting frame which is supported liftably in the housing 40, an upper roll supporting frame 14 supported on the beam 6 movably in the breadth direction of the upper roll, an upper roll holder 16 supported for inclination on the upper roll supporting frame 14, a worm jack 28 provided between the upper roll supporting frame 14 and the upper roll holder 16 for inclining the upper roll holder 16, an air cylinder 43 for pressing the beam 6 in the direction of the forming reaction force, and an air cylinder 30 for pressing the upper roll holder 16 in the direction of the forming reaction force.

Figure 32:
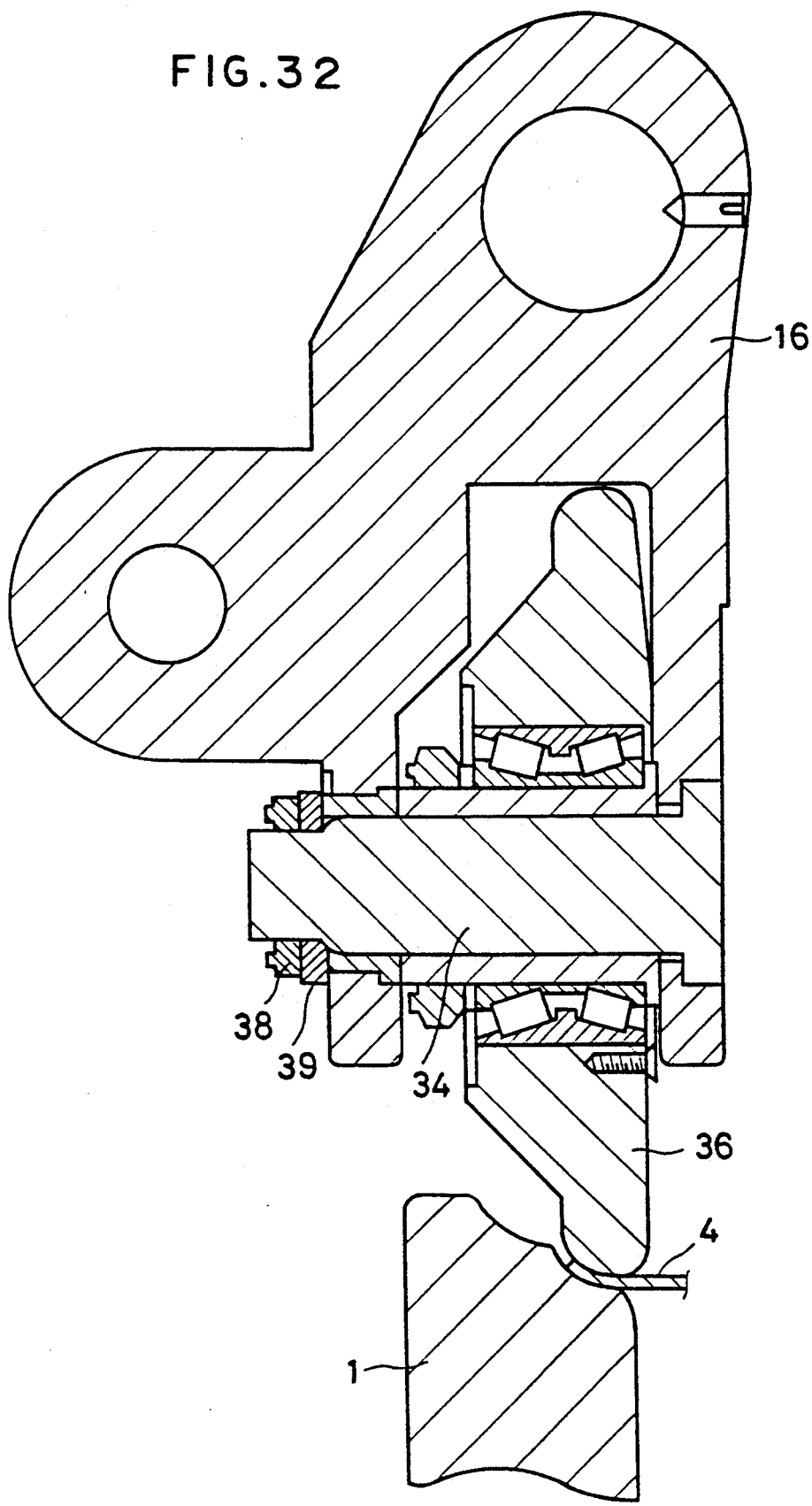
FIG. 32 is a cross sectional view of the portion of the machine shown in FIG. 31 wherein the upper roll is incorporated.

An assembly of the upper roll 36 and upper roll holder 16 is shown in FIG. 32. The upper roll in this embodiment is incorporated in the upper roll holder 16 in such a structure as shown in FIG. 32, in which the roll exchange will be carried out by releasing the fastening nuts 38, 39 on the outer face side, drawing out the roll shaft 34, and removing the roll shaft 34 from the upper roll 36.

According to the present invention, since a set of upper and bottom strip edge forming rolls each is made to be a pair of right and left split rolls and plural roll surface portions different in radius of curvature are provided respectively on these upper and bottom rolls, the edge forming of plural strips different in the size of a pipe to be produced can be carried out, in spite of one set of the rolls, whereby the number of rolls required therefore can be decreased and the labor for the roll exchange can be reduced.

Since the upper roll holder is given a function of inclining the upper roll in the breadth direction of the strip and the roll surface of the upper roll is divided into two or more portions different in radius of curvature, and furthermore, the accuracy and performance of the strip edge forming can be improved by positioning these portions opposite to the roll surfaces of the down roll, the outer peripheral surface of the upper roll can be effectively utilized as the plural upper roll surface portions.

Since the roll surface of the upper roll is provided on one side only, thereby increasing the thickness of the upper roll holder frame, the rigidity of the holder can be increased and the reversing mechanism of the upper roll holder can be placed therein. In addition, since the mill rigidity of the whole of the upper rolls is increased, the fulcrums of turn of the upper roll are made to have access to the pressing point of the rolls as near as possible and the elimination of backlash is realized, and the accuracy of setting the upper roll can be improved. The accuracy and performance of forming the strip edges can be also sharply improved, with the mill rigidity improved.

Figure 33A:
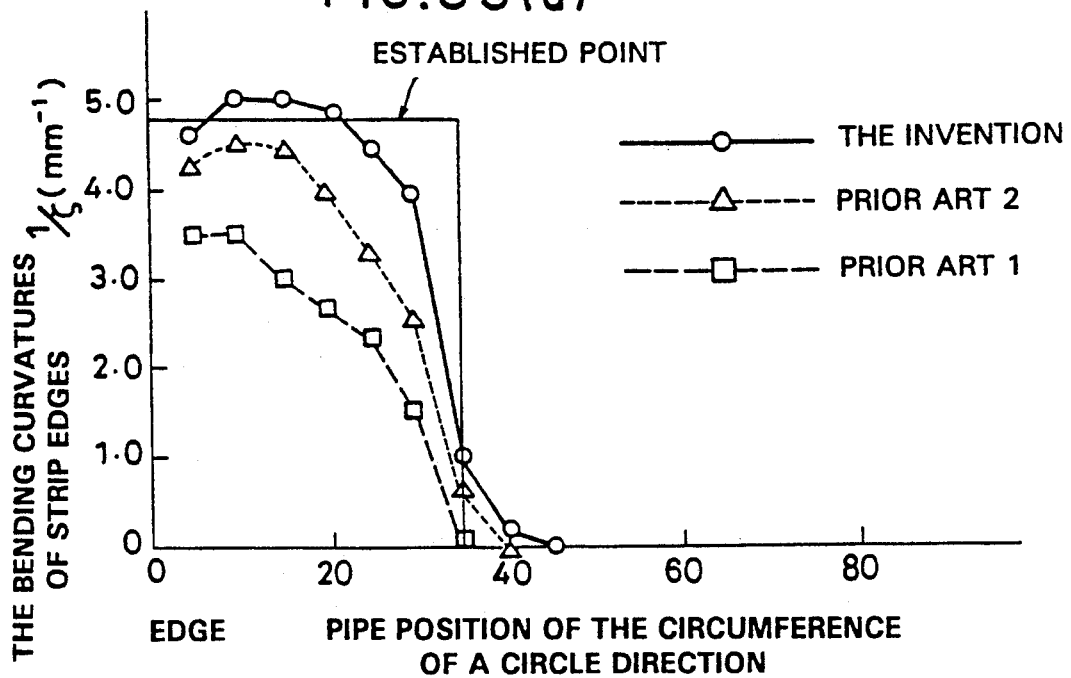
FIG. 33(a) and (b) are graphs for comparing the bending curvatures of strip edges.
Figure 33B:
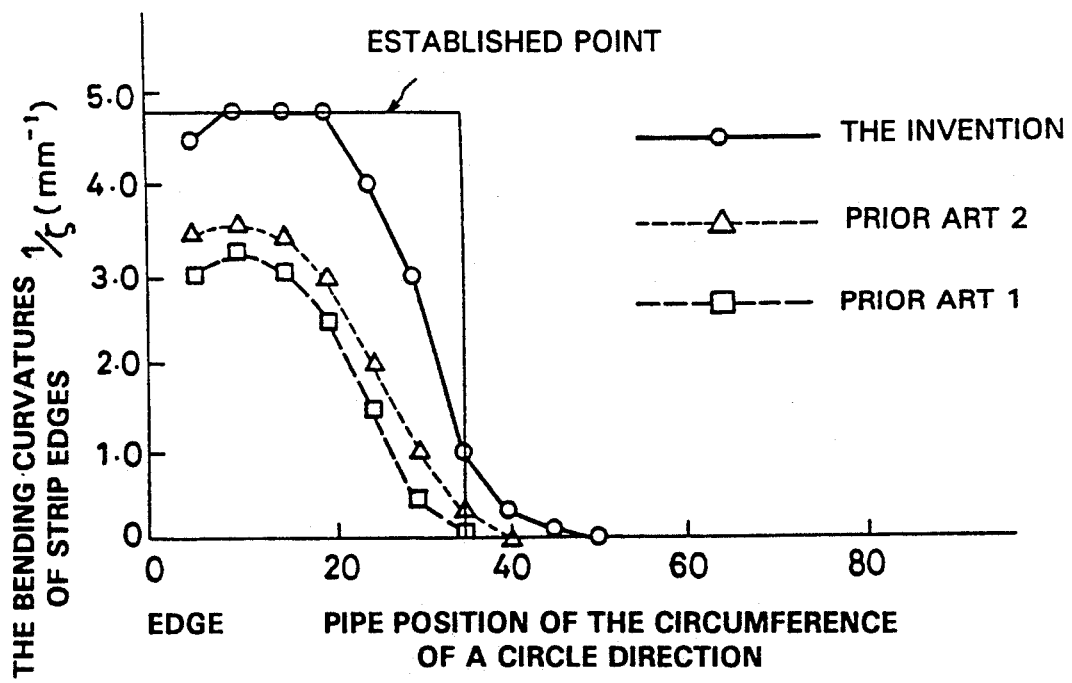
Figure 34:
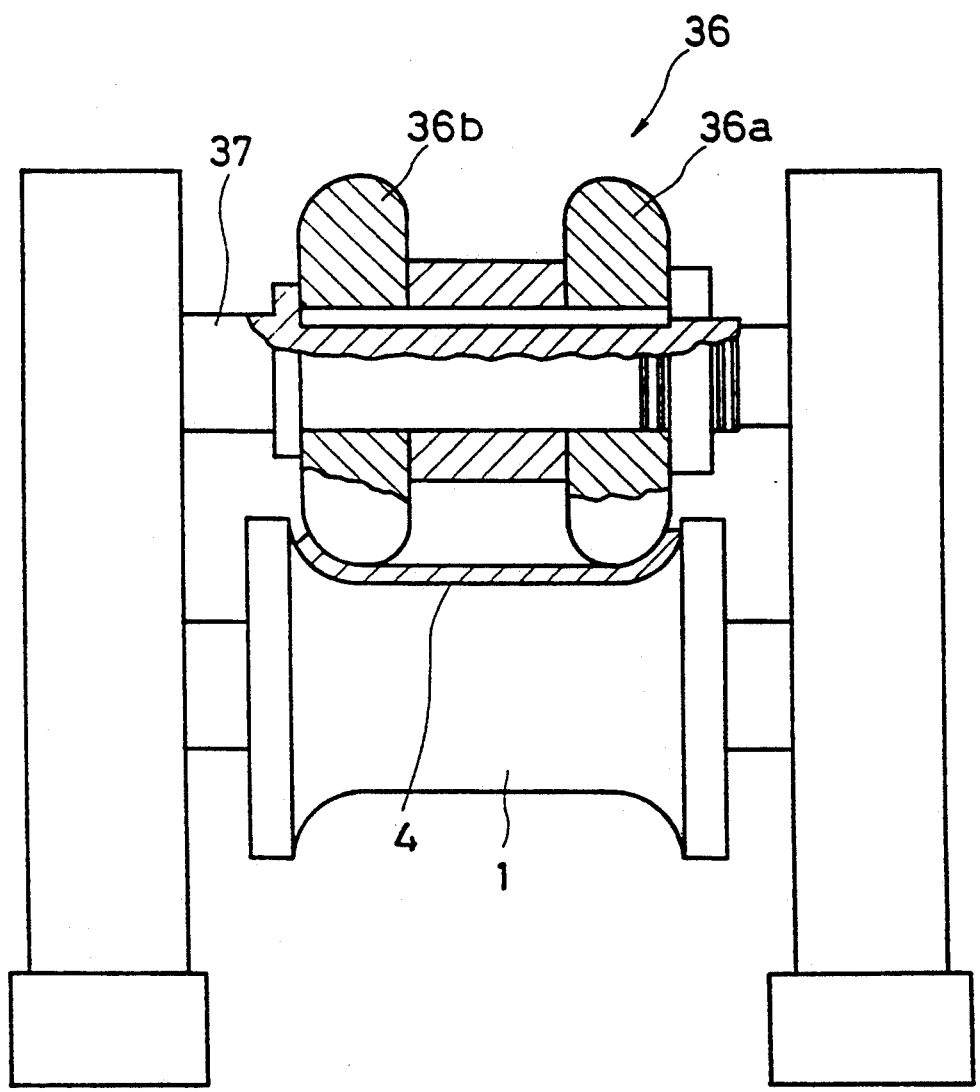
FIG. 34 is an illustrative view of one of prior art forming methods.
Figure 36:
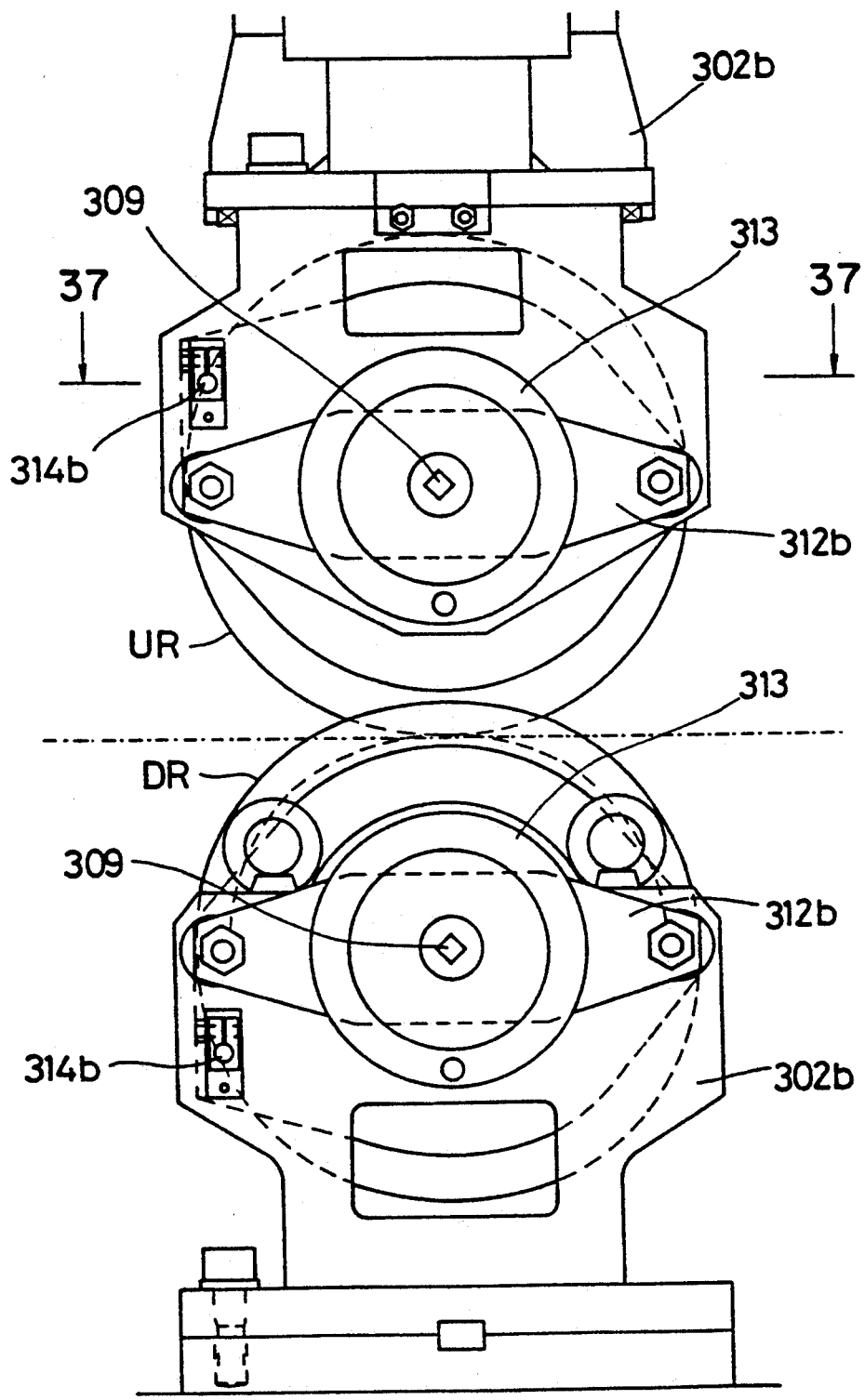
FIG. 36 is a side elevational view.
Figure 39:
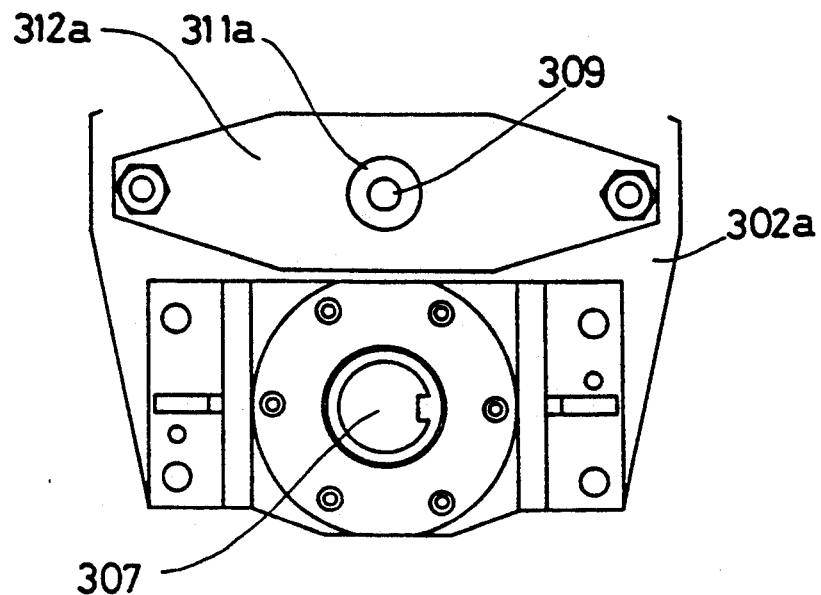
FIG. 39 is a side view of the main parts.
Figure 40:
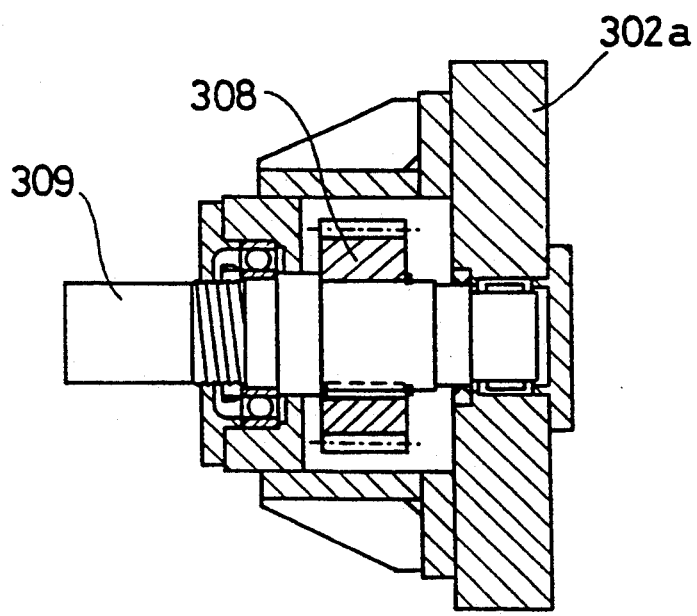
FIG. 40 is a cutaway plan view of the main parts, taken along the line C—C of FIG. 35.

As one example of the abovementioned effects, in Table 1, the frequency of roll exchange in the prior art example 1 (FIG. 34) is shown. The prior art example 2 (Japanese Patent Application No. 317289/1989) and the method according to the present invention, in the forming of strips for the outside diameters of pipes to be produced in a range of 31 φmm~44 φmm is also shown. Furthermore, the comparison of the strip edge bending characteristics in the case of Standard SUS 430 strips, 38.1 φmm×1.2 t mm and 2.5 t mm, are shown in FIGS. 33(a) and (b). From these results, it is obvious that in the frequency of roll exchange, the present invention stands comparison with the prior art example 2, and in the bending of strip edges, the present invention is much superior to the prior art examples in both the cases of the thin strip 1.2 mmt and thick strip 2.5 mmt.

TABLE 1

|  | Frequency of Roll Exchange | |
| --- | --- | --- |
|  | upper roll | down roll |
| Prior Art 1 | 5 | 5 |
| Prior Art 2 | 0 | 0 |
| The Invention | 1 | 0 |

(C) Split forming roll adjusting device (C-1) A driven split forming roll adjusting device for the bottom roll of the edge bending roll, the upper and bottom rolls of the first center bending roll or the like.

The drawings in FIG. 35 to FIG. 40 show a center bending roll of the driving type according to the present invention.

In the drawings in FIG. 35 to FIG. 40, the designation UR represents an upper roll, and DR a bottom roll, respectively. These rolls are the same, except that the contours of the roll bodies (split forming rolls) are essentially different and their supporting frames are different. Both of these rolls will be described together.

The reference numeral 301 represents a main hollow shaft journaled at both its ends on supporting frames 302a and 302b, 303a, 303b: a pair of right and left cylindrical roll holders put on the outer periphery of the middle portion of the said main shaft 301 so as to be slidable in the axial direction, 304a, 304b: position retaining means provided in the roll holders, which will be stopped at an optional position, and 305a, 305b: a pair of right and left split forming rolls fixed at the inner ends of the roll holders, respectively. In addition, the split forming rolls of the bottom roll have an auxiliary roll 305c for receiving a strip, midway between them.

The reference numeral 306 represents a gear fixed at one end of the main shaft, and 307: a driving shaft journaled on the supporting frame 302a in the vicinity of one end of the main shaft, and having a gear 308 fixed on its middle portion for engagement with the said gear 306, whose end is to be mechanically connected with a universal joint (not shown) of a driving unit, respectively.

The reference numeral 309 represents an adjustment shaft mounted running through the inner hollow portion of the main shaft, 310a, 310b: a pair of threaded portions provided on both the ends of the adjustment shafts, different in the threading direction, 311a, 310b: screw-movers screw-engaged on both the threaded portions so as to be capable of being screw-advanced or retreated thereon, respectively, 312a, 312b: transmission mechanisms placed between one screw-mover and one roll holder and between the other screw-mover and the other roll holder, respectively, 313: a handle for manual rotation fixed at the other end of the adjustment shaft, and 314a, 314b: moving quantity indicating degital gauges provided between the supporting frames and the transmission mechanisms, respectively.

The position retaining means 304a, 304b provided in the roll holders 303a, 303b each comprises an oil-hydraulic reduction mechanism for reducing their inner periphery, in which an annular oil pressure cell 341a, 341b running along the inner periphery of the roll holder 303a, 303b is provided in the inside of the peripheral wall of the roll holder very nearly to its inner peripheral surface, and composed so as to be supplied with an oil pressure from the outside, wherein by the same oil pressure, the thin reduction portion 342a, 342b constituting the inner wall of the oil pressure cell is expanded toward the main shaft 301 so as to be pressed against the periphery of the main shaft 301.

The roll holders 303a, 303b each has a flange 331a, 331b provided at its inner end, and annular split forming rolls 305a, 305b each is fixed on the said flanges by screws.

The adjustment shaft 309 is mounted at both the ends of the main shaft 301 by way of bearings 391a, 391b so as to be rotatable, but immobile in the axial direction. In addition, precision screws may be preferably used for the screw-engagement of the threaded portions 310a, 310b of the adjustment shaft 309 with the screw-movers 311a, 311b.

The transmission mechanisms 312a, 312b are composed so that a cylindrical rotary joint 422a, 422b is mounted on the outer periphery of the outer end of each roll holder 303a, 303b by way of a bearing 421a, 421b, so as to be rotatable, but immobile in the direction of the cylinder, a bar 423a, 423b projecting inward is put and fixed on the outer periphery of the screw-mover 311a, 311b, and a pair of supporting cylinders 321a, 321b, are provided in parallel to the main shaft 301 on both the wings of each of the supporting frames 302a, 302b, and rods 424a, 424b, are slidably provided running through each of these supporting cylinders, and one end of each of these rods is connected with both the ends of the said bars 423a, 423b, and the other end thereof with both the wings of the said rotary joints 422a, 422b, respectively.

The rotary joints 422a, 422b, have an oil passage 343a, 343b leading to the oil pressure cell 341a, 341b of the said oil-hydraulic reduction mechanism, and the said oil passages are connected with an oil hose (not shown) leading to an external oil-hydraulic device.

When the space between the split forming rolls 305a, 305b is adjusted, due to the abovementioned embodiment, the handle 313 may be preferably rotated clockwise or counterclockwise, while watching the digital gauges 314a, 314b, after the oil pressure supplied to the position retaining means 304a, 304b, i.e., the oil-hydraulic reduction mechanisms is shut down. Then, the adjustment shaft 309 is rotated so that two screw-movers 311a, 311b screw-engaged with the threaded portions at both the ends of the adjustment shaft are screw-advanced or retreated mutually in the reverse directions. This screw-advance and retreat of them is transmitted to the roll holders 303a, 303b by way of the transmission mechanisms 312a, 312b, whereby the split forming rolls 305a, 305b are approached to or alienated from each other.

After the space between the split forming rolls has been thus adjusted, the oil pressure is supplied to the oil pressure cells 341a, 341b of the oil-hydraulic reduction mechanisms that are the position retaining means 304a, 304b, and by the same oil pressure, the thin reduction portions 342a, 342b are reduced so as to be constrained in position with respect to the main shaft 301.

In addition, the rotating force from the driving unit is transmitted to the driving shaft 307 by way of a universal joint (not shown), and further transmitted to the main shaft 301 by way of the gears 308, 306 and to the split forming rolls 305a, 305b by way of the roll holders 303a, 303b.

According to the present invention, there will be obtained such effects as follows:

① Since a driving shaft connected with a driving unit is mounted in the vicinity of one end of a main shaft and a rotating force can be transmitted from the gear provided on the driving shaft to the gear of the main shaft, it is possible to simplify a driving means, and to make its width (length) in the direction of the main shaft narrow (short) so that the driving means can be compacted.

② It is possible not only to drive the main shaft and the split forming rolls, without any troubles, but also to adjust the roll space optionally, and further it is possible to compact the whole of the forming roll externally.

③ Since a position retaining means is provided between the main shaft and the roll holder, it is possible to restrict the runout of the outside diameter of the forming rolls, and a a result, these forming rolls are optimum for use in the manufacture of pipes from a thin strip. Furthermore, since no load is transmitted to the threaded portion of the adjustment shaft by actuating the position retaining means, the same threaded portion is not damaged.

④ Since the adjustment of the roll space can be carried out very easily and in a short time only by operating the position retaining means and the handle, it is possible to decrease the suspension time of a pipe manufacturing line as short as possible. ⑤ It is possible to carry out the adjustment of the roll space very precisely in an order of 1/100 mm, by using precision screws for the screw-engagement of the threaded portion of the adjustment shaft with the screw-movers and by detecting the moving quantity of the split forming rolls by the digital gauges.

⑥ It is possible to stabilize the quality of products.

(C-2) A non-driven split forming roll adjusting device for each upper roll of the second to third center bending rolls or the like.

The split roll of the illustrated example in FIG. 41 and FIG. 42 is an upper roll. The upper roll and a bottom roll are merely different in the contour of their roll periphery, and the adjusting device can be applied to either of the upper and bottom split rolls.

The adjusting device will be further described with reference to the drawings.

The reference numeral 501 represents a main shaft, and this main shaft is formed by putting an outer cylinder shaft 503 rotatably on the outer periphery of a core shaft 502. Screw shafts 504 which are mutually in a reverse screw relation are provided projectingly in the direction of their elongation from the centers of both the right and left end surfaces of the said core shaft 502. Nuts 505 are screw-engaged on both these screw shafts 504, and a handle 506 for rotation of the core shaft is attached on one of the screw shafts.

Both the right and left portions of the main shaft 501 are fixed on supporting plates 510. In the case of an adjusting device for the bottom roll, as mentioned above, the supporting plate each is constituted by a portion of a stand thereof, and for the upper roll, by a suspension plate hung down from a stand thereof, respectively.

A pair of right and left sliding sleeves 515 are put on the middle portion of the main shaft between the supporting plates 510 so as to be slidable in the axial direction. These sliding sleeves are made to be positionable at an optional position with respect to the outer cylinder shaft 503. In the illustrated example, namely, there are used oil-hydraulic reducible sleeves, wherein the oil pressure cell 516 provided on the inner peripheral side of each sleeve is pressurized to reduce the bore portion thereof so that the outer cylinder shaft 503 is clamped and fixed, or the oil pressure is decreased to restore the sleeve bore portion so that the sleeve becomes slidable again. For such a positioning mechanism, there can be adopted various other kinds of means.

The sliding sleeves 515 have split rolls 520, put rotatably on their outer peripheries, respectively. A bearing 525 is made to intervene between the split roll and the sliding sleeve.

The said sliding sleeves 515, and the abovementioned nuts 505, are connected with each other by rods 530 . . . Engaging plates 531, 532 are protruded from the outer ends of the sliding sleeves and from the portions of the nuts, respectively, and the said rods are connected running through the supporting plates 510 by way of these engaging plates.

The reference numerals 535 represent linear sensors attached on the right and left supporting plates 510, which serve to measure the lateral sliding quantity of the split rolls.

Precision screws such as ball screws may be preferably adopted for the screw shafts and nuts, thereby eliminating backlash.

The present invention has the abovementioned constitution in which a main shaft 501 is formed by putting an outer cylinder shaft 503 rotatably on the outer periphery of a core shaft 502, both the right and left portions of the main shaft 501 are fixed on supporting plates 510, and screw shafts 504, which are mutually in a reverse screw relation are provided projectingly from the centers of both the end surfaces of the said core shaft 502 and nuts 505 are screw-engaged with the said screw shafts 504, and the said nuts and a pair of right and left sliding sleeves 515, put on the middle portion of the main shaft 501 so as to be slidable in the axial direction are connected with each other by rods 530. Only by rotating a handle 506 or the like attached on the outer end of one of the screw shafts to approach or alienate split rolls 520 put on the said sliding sleeves to or from each other, the space between them can be easily adjusted. Furthermore, since a positioning mechanism is provided on the sliding sleeves 515, respectively, the sliding sleeves and the split rolls put on the said sliding sleeves can be prevented from moving axially with respect to the main shaft 501.

(D) Upper roll actuating apparatus

Figure 43:
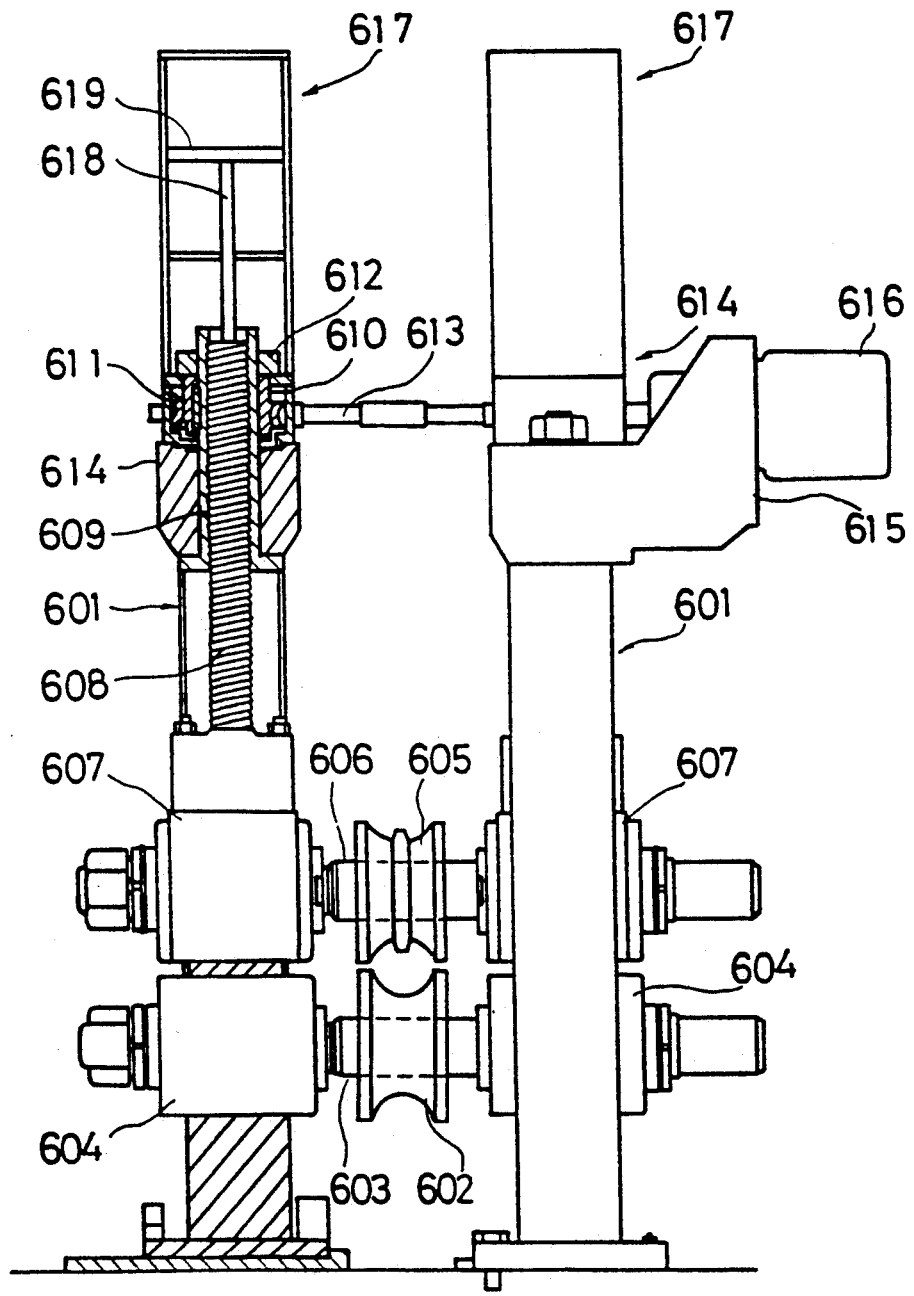
FIG. 43 is a partially cutaway front view of the means according to the present device.

FIG. 43 shows the upper roll actuating apparatus of the first and second fin pass rolls 1F and 2F, to which the backlash eliminating means is applied.

In FIG. 43, the reference numeral 601 represents a pair of right and left stands, wherein first chocks 604, supporting both the ends of a shaft 603 on which a bottom roll 602 is put are inserted in the lower portions of both these stands. Long holes are vertically provided in the upper portions of the stands above these first chocks, and second chocks 607, supporting both the ends of a shaft 606 on which an upper roll 605 is put are inserted movably up and down in the lower portions of these long holes. Screw shafts 608 are provided standingly through the insides of the stands from the top surfaces of the second chocks, and screw pipes 609 are screw-engaged with the upper portions of the screw shafts. The screw pipe runs through the inside of the upper portion of the stand, with its upper portion projected upward out of the stand. A worm wheel 610 is put and fixed on the outer periphery of the lower portion of the upward projected portion. The worm wheel is surrounded by a box 611, and a retaining ring 612 put and fixed on the outer periphery of the upper portion of the screw pipe above the worm wheel is mounted on the box.

Worms (not shown) put on both the sides of a worm shaft 613 are engaged with the worm wheel, and they constitute worm jacks 614. On the other hand, the worm jacks are made operable by a reversible motor 616 fixed on an arm 615 projected from the side portion of the stand.

Fluid-hydraulic cylinders 617 are provided standingly from the said boxes 611, and the lower ends of the piston rods 618 of the said cylinders are connected with the upper ends of the screw shafts, whereby the upper roll 605 can be pulled up by way of the screw shafts 608, with the lift of the pistons 619.

FIG. 3 shows the upper roll actuating apparatus of the center bending rolls, to which the backlash eliminating means is applied. In this embodiment, there are separately provided bottom roll stands 21, 21 and upper roll stands (not shown). Brackets 626, 626 are provided standingly from the beams 23, 23 of the upper roll stand so as to bear a worm shaft 613, and one of the said brackets supports a reversible motor 616 so that the worm shaft is rotatable thereby. A worm jack 614 is provided on the middle portion of the worm shaft 613, and placed on a bed plate 627 installed between the beams. A suspension base plate 628 is hung at the lower end of the screw shaft 608, and both the ends of a shaft 606 on wich upper rolls 14, 15 are put are journaled in the lower portions of arms 629, hung down from both the right and left sides of the base plate. The lower ends of fluid-hydraulic cylinders 617 are fixed on both the right and left sides of the said bed plate 627, and the lower ends of the piston rods 618 of the cylinders are connected to both the right and left sides of the suspension base plate 628 so as to be capable of being pulled up.

The present device has the abovementioned constitution. In the case of FIG. 43, namely, the fluid-hydraulic cylinders 617 are provided above the screw shaft 608 for moving the upper roll put-on shaft 606 up and down, and the lower ends of the piston rods 618 of the said cylinders are connected to the upper ends of the said screw shafts 608, so that the upper roll 605 can be pulled up. Accordingly, there is no need of labor at the time when the stand on the movable side is pulled out for exchange of the upper roll as in the prior art.

In the case of FIG. 3, both the ends of the upper roll put-on shaft 606 are journaled in the arms 629 of the suspension base plate 628, the suspension base plate is made movably up and down by the worm jack 614 and the same suspension base plate is made to be capable of being pulled up by the fluid-hydraulic cylinders separately provided. Accordingly, the fluid-hydraulic cylinders are not any obstacle to the exchange of the upper roll.

In the case of the pulling-up force of the fluid-hydraulic cylinder is set to be the tare of the pulling-up portions of the said cylinder+the strip forming load×10~20%, it is possible to carry out the elimination of backlash with a proper force.

(E) Cage rolls

Figure 44:
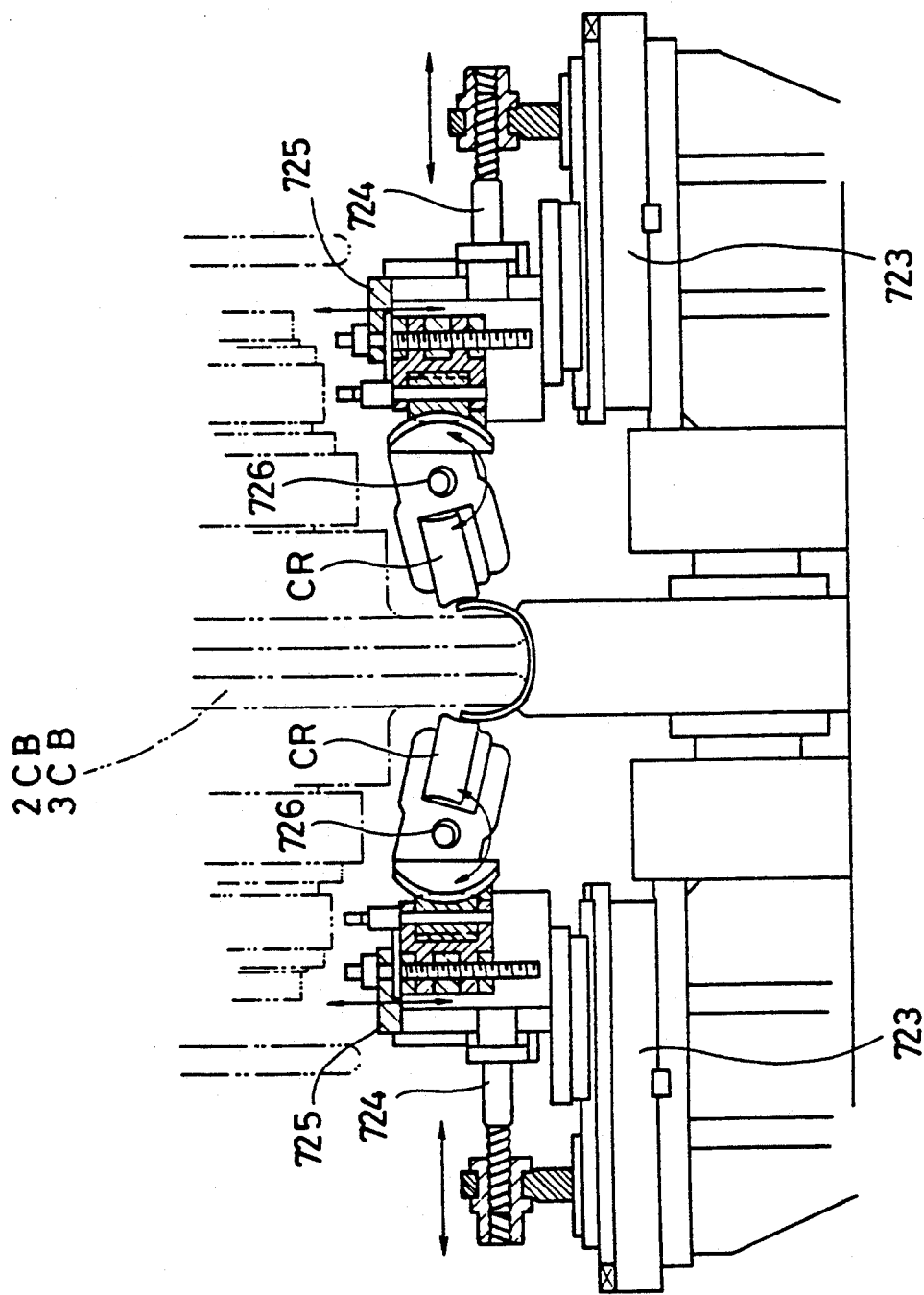
FIG. 44 is an enlarged elevational view in section of the main parts of FIG. 1, and FIG. 45 and FIG. 46 are views illustrative of the operation.
Figure 45:
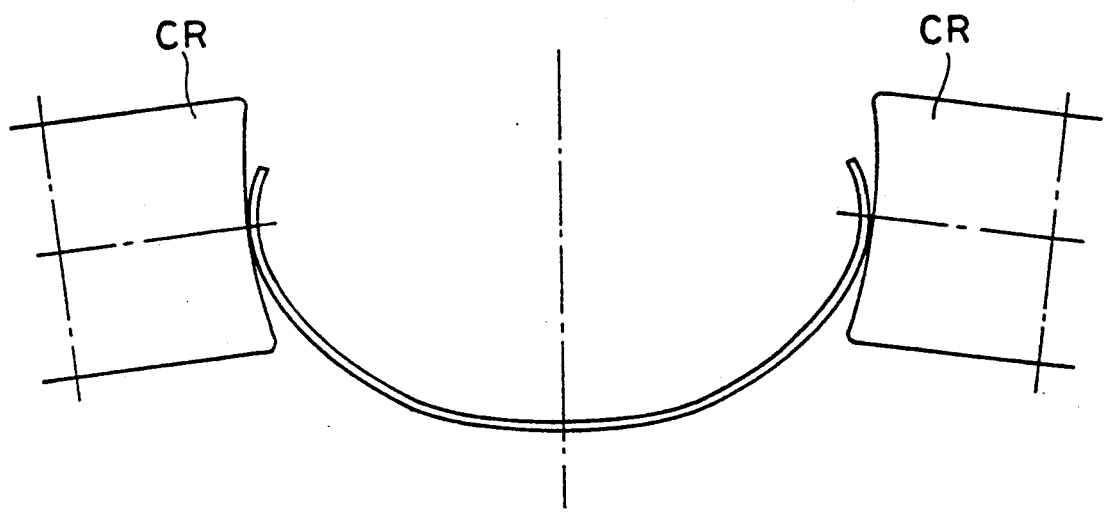
Figure 46:
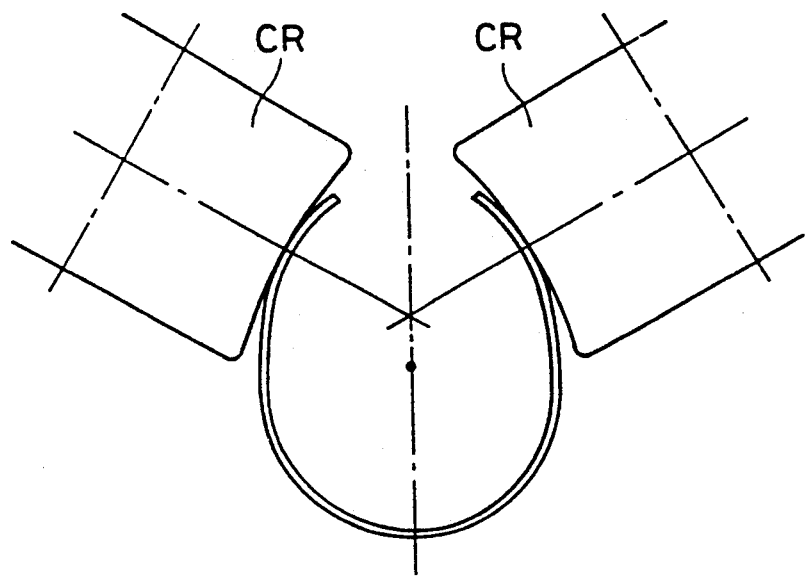
Figure 47:
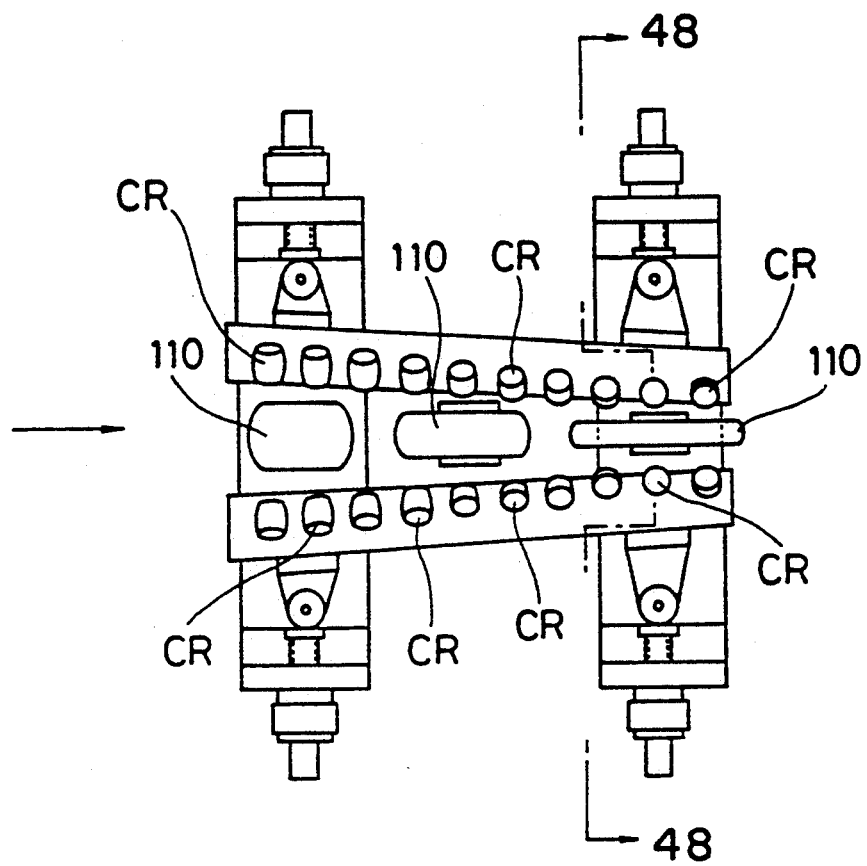
Figure 48:
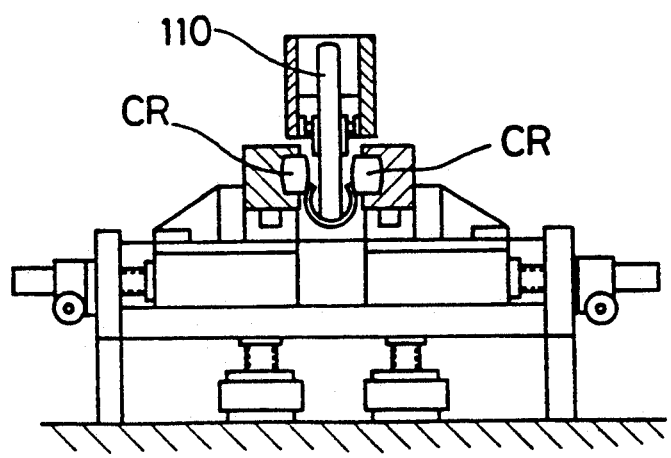
Figure 49:
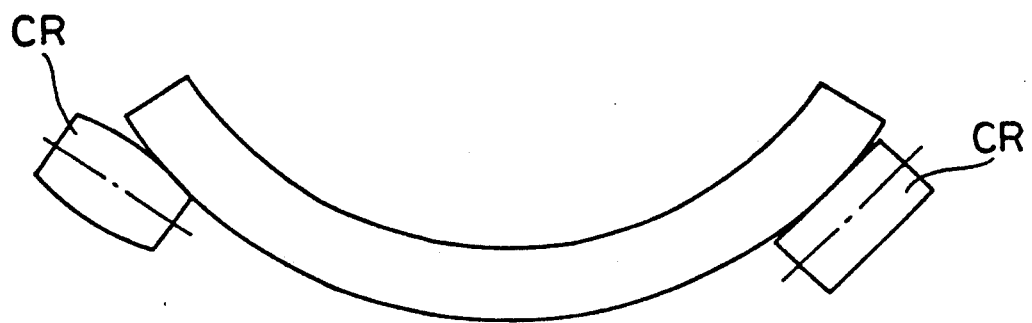
Figure 50:
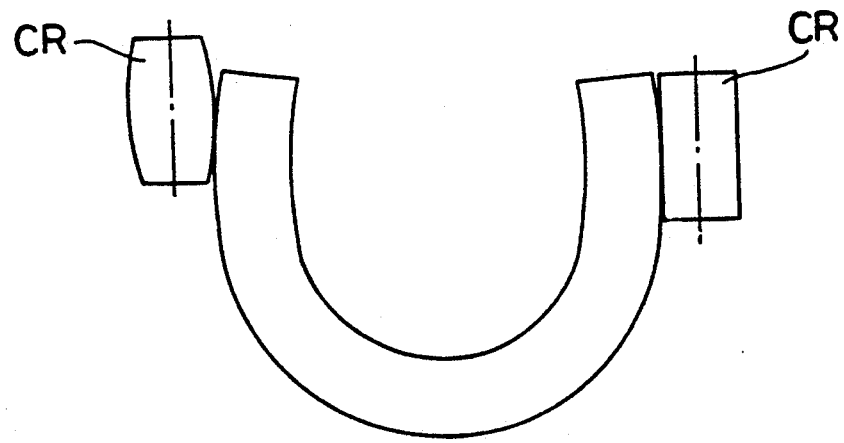
Figure 51:
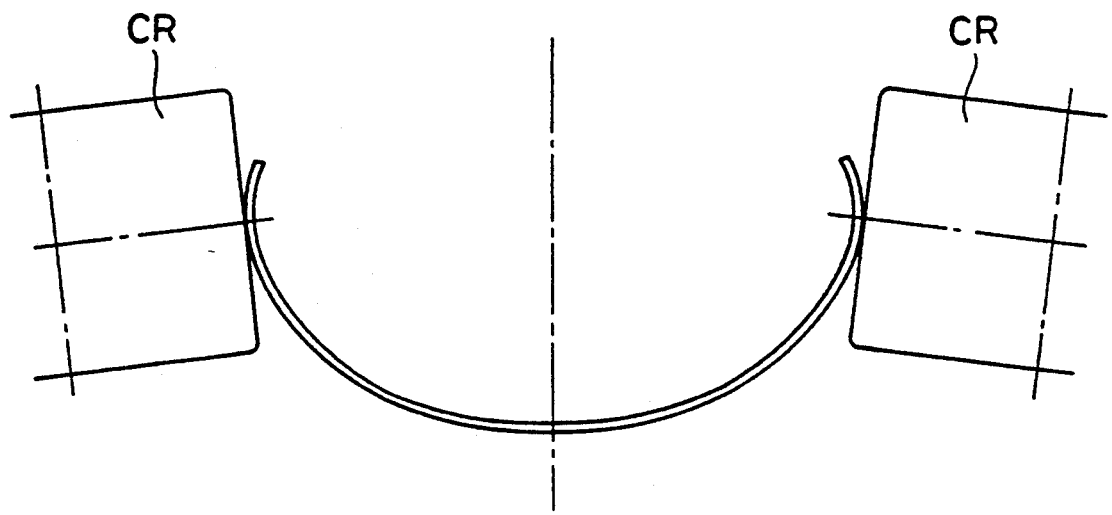
Figure 52:
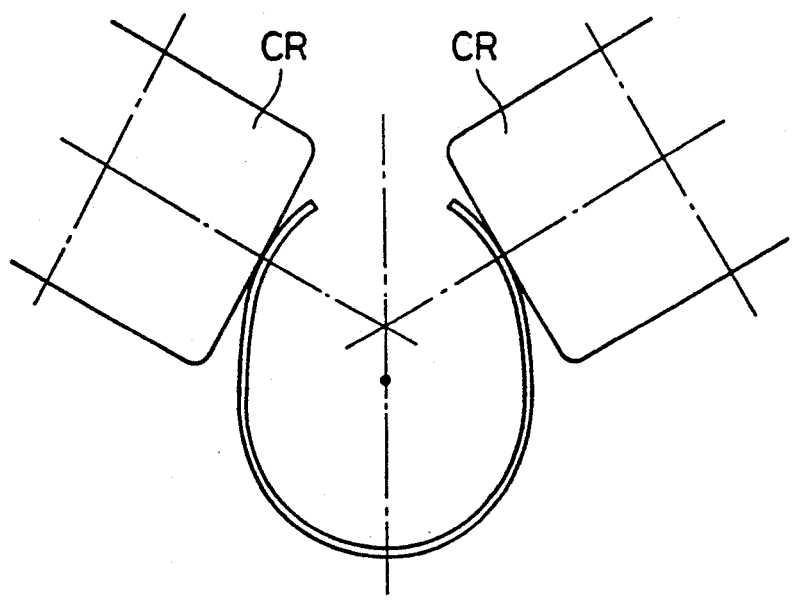

FIG. 44 to FIG. 46 are illustrative views showing the modification examples of the cage rolls.

The cage rolls CR . . . , CR . . . serve to apply lateral pressure to the pipe edge portions and pipe side portions from both the sides so that the boundaries between the pipe side portions and pipe bottom portion are gradually bent in excess of the finally formed circle and the pipe bottom portion is gradually bent almost equally to the finally formed circle or slightly in excess. Accordingly, the pipe which has passed this bending step becomes oval in cross section.

As to the cage rolls CR . . . , however, a total of twelve rolls are arranged on both sides in four zones, three rolls in each zone, and as shown in FIG. 44, they serve to properly apply forces to the pipe edge portions and pipe side portions from the outsides so that the boundaries between the pipe side portions and pipe bottom portion are bent in order, with restraining the spring-back. The three cage rolls in each zone are mounted in one roll stand 723 . . . and in each of these roll stands, each cage roll has an advance and retreat control means 724, a lift control means 725 and an angle adjustment means 726 provided individually therein.

In the respective cage rolls CR . . . , CR . . . , their roll surface is shaped in the form of a concavely curved face whose radius of curvature is made 1.0~2.0 times as large as the maximum outside diameter of various sizes of pipes to be produced, to which these rolls are applicable.

By the abovementioned machine, welded steel pipes, 22.22~60.5 mm in outer diameter, were manufactured using strips, 0.8~3.0 mm in thickness. It was not found at all that the pipes were made flat in a stripe-pattern by the cage rolls CR . . . , CR . . . .

According to the present invention, since the roll surface of a cage roll is shaped in the form of a concavely curved face having a larger radius of curvature than that of a forming flower at its own position, the roll surface can be suitably fitted to the convexly curved face of the forming flower. Accordingly, it is possible to prevent the surface of a welded pipe from being made flat in a stripe-pattern, and it is further possible to make its appearance good, and to improve its quantity.

INDUSTRIAL APPLICABILITY

Using the welded steel pipe manufacturing machine and method for handling the same machine according to the present invention, as described above, it is possible to form strips stably and manufacture welded steel pipes superior in quality, with improving the rate of operation, by virtue of the compact constitution of the machine.

What is claimed:

1. A machine for manufacturing welded steel pipes, in which a strip is continuously roll-formed to shape a pipe and its butted seam is welded, having an edge bending roll for constraining under pressure a strip from its pipe edge portions to the boundaries between the pipe edge portions and said pipe side portions to bend the strip, a first center bending roll for constraining under pressure the pipe side portions to bend the pipe side portions, second to fourth center bending rolls for constraining under pressure the strip from the boundaries between the pipe side portions and its pipe bottom portion to the pipe bottom portion and applying lateral pressure to the pipe from both sides to bend the boundaries and the pipe bottom portion and a plurality of cage rolls arranged on both the sides of these center bending rolls, first and second fin pass rolls for further forming under pressure the pipe, are arranged in order from the upstream side to the downstream side of a roll forming process, wherein at least the edge bending roll, the first center bending roll, the first and second fin pass rolls each has a driving means provided thereon, and all the upper rolls of the first to fourth center bending rolls are set in one housing, and all the bottom roll stands of the first to fourth center bending rolls or all the bottom roll stands of the second to fourth center bending rolls are set on one common sub-base plate.

2. A machine for manufacturing welded steel pipes, as set forth in claim 1, in which both the upper roll and bottom roll of the edge bending roll and the first center bending roll are made to be a split roll adjustable in width, the bottom roll each of the second to fourth center bending rolls is made to be a caliper-shaped one-part roll fitting to the maximum pipe diameter of an applicable common range of use, the upper roll of each of the second and third center bending rolls is made to be a split roll adjustable in width, and the upper roll of the fourth center bending roll is made to be a one-part roll applicable for common use, and the cage rolls are mounted so as to be adjustable for slant advance and retreat.

3. A method for handling a welded steel pipe manufacturing machine in which first to fourth center bending rolls are arranged in order in an intermediate roll-forming process and all the upper rolls of these center bending rolls are set in one housing, characterized in that all the upper rolls of the first to fourth center bending rolls are exchanged at a stroke by exchanging the said housing.

4. A method for handling a welded steel pipe manufacturing machine, characterized in that all the bottom roll stands of first to fourth center bending rolls or all the bottom roll stands of second to fourth center bending rolls are set on one detachable common sub-base plate, and all the down rolls of the first to fourth center bending rolls are exchanged at a stroke together with the said common sub-base plate.

5. A machine for manufacturing welded steel pipes, as set forth in claim 1, in which in the first to fourth center bending rolls, each upper roll mounted on an upper roll common stand frame and each bottom roll mounted on a bottom roll common stand are made individually liftable, respectively.

6. A method for handling a welded steel pipe manufacturing machine, as set forth in claim 3, in which the upper roll common stand frame of the first to fourth center bending rolls has a positioning means and a clamping means provided thereon, and in the exchange of rolls, the clamping means is released to disengage the common stand frame, and then a new common stand frame is inserted, and set at a predetermined position by actuating the positioning means and clamping means.

7. A method for handling a welded steel pipe manufacturing machine, as set forth in claim 4, in which the bottom roll common stand frame of the first to fourth center bending rolls has a positioning means and a clamping means provided thereon, and in the exchange of rolls, the clamping means is released to disengage the common stand frame, and then a new common stand frame is inserted, and set at a predetermined position by actuating the positioning means and clamping means.

8. A machine for manufacturing welded steel pipes, as set forth in claim 1, in which a bottom guide roll for receiving the pipe is arranged in a section between the fourth center bending roll and the first fin pass roll.

9. A machine for manufacturing welded steel pipes, as set forth in claim 1, in which the bottom roll and upper roll of the edge bending roll each is made to be a pair of split rolls symmetrical right and left, said bottom roll is made to be a stepped roll having plural steps different in outside diameter in which the inner side is for smaller pipes, wherein concavely curved portions different in radius of curvature are provided respectively in the portion of each step opposite to the edges of a strip, and in said upper roll, the contour of its outer peripheral profile in a plane including the roll center axis is such that only the outer face side of the roll has a convexly curved form, the upper roll is journaled in a holder so that its setting position can be changed to a position opposite to each step of the said stepped roll, and the convexly curved form of the upper roll comprises a combination of sectors different in radius of curvature, and the upper roll holder has a function of inclining the upper roll in the breadth direction of the strip.

10. A machine for manufacturing welded steel pipes, as set forth in claim 9, in which the center of inclination of the upper roll of said edge bending roll is set on the normal line erected at the end of the convexly curved face of the upper roll.

11. A machine for manufacturing welded steel pipes according to claim 9, in which said upper roll holder comprises a lifting frame supported liftably in a housing, an upper roll supporting frame supported on the lifting frame movably in the breadth direction of the upper roll, an upper roll holder supported for inclination on the upper roll supporting frame, a jack device provided between the upper roll supporting frame and the upper roll holder for inclining the upper roll holder, a cylinder device for pressing the lifting frame in the direction of the device for pressing the lifting frame in the direction of the forming reaction force, and a cylinder device for pressing the upper roll holder in the direction of the forming reaction force.

12. A machine for manufacturing welded steel pipes according to claim 1, further comprising an adjusting device for a driven form roll in which the structure of said adjusting device such as the bottom roll of the edge bending roll, and the upper and bottom rolls of the first center bending roll is composed so that on the outer periphery of the middle portion of a hollow main shaft journaled on both the sides, a pair of right and left cylindrical roll holders are put slidably in the axial direction, and a position retaining means is provided for retaining the roll holders at an optional position, and a pair of right and left split forming rolls are in both the holders at their inner ends, respectively, a gear for mechanically engaging the main shaft to a driving unit is fixed at one end of the main shaft, and further an adjustment shaft is rotatably put running through the hollow inside of the said main shaft, a pair of threaded portions different in the thread direction are provided at both the ends of the adjustment shaft and screw-movers are engaged for screw-advance and retreat with both the said threaded portions, a transmission mechanism for transmitting the said screw-advance and retreat is provided between one screw-mover and one roll holder and between the other screw-mover and the other roll holder, and a handle for rotation is provided at a proper position on the said adjustment shaft.

13. A machine for manufacturing welded steel pipes according to claim 1, further comprising an adjusting device for a non-driven forming roll in which the structure of said adjusting device of a non-driven forming roll such as each upper roll of the second to third center bending rolls is composed so that both the right and left portions of a main shaft formed by putting an outer cylinder shaft rotatably on the outer periphery of a core shaft are fixed on supporting plates, a pair of right and left sliding sleeves with a positioning mechanism are put on the middle portion of the said main shaft so as to be slidable in the axial direction, and a pair of right and left split rolls are put rotatably on the outer peripheries of the said sleeves, respectively, and screw shafts which are mutually in a reverse screw relation are provided projectingly from both the ends of the said core shaft, respectively, nuts screw-engaged with the both these screw shafts and the said sliding sleeves are connected with each other by rods and a core shaft-rotating means is attached on the end of the said screw shafts.

14. A machine for manufacturing molded steel pipes according to claim 1, further comprising a backlash eliminating means in which a screw shaft is erected from second chocks supporting both the ends of an upper roll puton shaft, respectively, each of these screw shafts is incorporated in worm jacks at both the right and left portions of a worm shaft supported on a stand, an upper roll actuating apparatus is provided for making the upper roll movable up and down by way of the said screw shafts by the rotation of the said worm shaft in both the normal and reverse directions, a fluid-hydraulic cylinder is provided above both the said screw shafts, respectively, and the piston rods of the said cylinders are connected with the upper ends of both the screw shafts so that the upper roll can be pulled up.

15. A machine for manufacturing welded steel pipes according to claim 1, in which the roll surface of said cage roll is shaped in the form of a concavely curved face having a larger radius of curvature than that of a forming flower at its own position.

* * * * *